United States Patent
Cheng et al.

(10) Patent No.: US 7,320,834 B2
(45) Date of Patent: Jan. 22, 2008

(54) ORGANIC LIGHT EMITTING DIODE CONTAINING A NOVEL IR COMPLEX AS A PHOSPHORESCENT EMITTER

(75) Inventors: Chien-Hong Cheng, Hsinchu (TW); Jiun-Pey Duan, Hsinchu (TW); Dinesh Kumar Rayabarapu, Hsinchu (TW); Betty Marie Jennifer. S. P., Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 451 days.

(21) Appl. No.: 10/822,647

(22) Filed: Apr. 13, 2004

(65) Prior Publication Data

US 2005/0227109 A1 Oct. 13, 2005

(30) Foreign Application Priority Data

Jul. 24, 2003 (TW) ............... 92120288 A

(51) Int. Cl.
*H01L 51/54* (2006.01)
*C09K 11/06* (2006.01)

(52) U.S. Cl. .............. 428/690; 428/917; 313/504; 313/506; 257/E51.044

(58) Field of Classification Search ........... None
See application file for complete search history.

(56) References Cited

U.S. PATENT DOCUMENTS

| | | | | |
|---|---|---|---|---|
| 5,432,014 | A * | 7/1995 | Sano et al. | 428/690 |
| 6,797,980 | B2 * | 9/2004 | Takiguchi et al. | 257/40 |
| 7,022,422 | B2 * | 4/2006 | Hamada et al. | 428/690 |
| 2002/0034656 | A1 * | 3/2002 | Thompson et al. | 428/690 |
| 2002/0100906 | A1 * | 8/2002 | Takiguchi et al. | 257/40 |
| 2002/0125818 | A1 * | 9/2002 | Sato et al. | 313/504 |
| 2003/0194580 | A1 * | 10/2003 | Hamada et al. | 428/690 |
| 2005/0123792 | A1 * | 6/2005 | Deaton et al. | 428/690 |
| 2005/0123795 | A1 * | 6/2005 | Lussier et al. | 428/690 |
| 2005/0123798 | A1 * | 6/2005 | Deaton et al. | 428/690 |

\* cited by examiner

*Primary Examiner*—Marie Yamnitzky
(74) *Attorney, Agent, or Firm*—Bacon & Thomas, PLLC

(57) ABSTRACT

A phosphorescent Ir complex having the following structures (I) or (II) is used as an emitter in an organic light emitting diode (OLED):

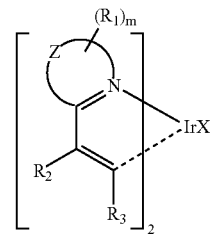

I

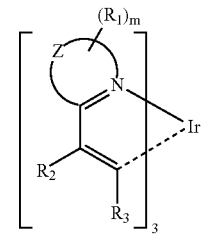

II wherein X is an arbitrary monoanionic bidentate ligand; Z is an arbitrary moiety constituting a nitrogen-containing heterocyclic group; $R_1$ is a substituent on the nitrogen-containing heterocyclic group; m is 0 or a positive integer; $R_2$ and $R_3$ independently are H, halogen, C1-C6 alkyl, a halogen-substituted C1-C6 alkyl, C1-C6 alkoxy, phenyl C1-C6 alkyl, amino, aryl, heterocyclic aryl substituent.

27 Claims, 7 Drawing Sheets

ORGANIC LIGHT EMITTING DIODE CONTAINING A NOVEL IR COMPLEX AS A PHOSPHORESCENT EMITTER

FIELD OF THE INVENTION

The present invention relates to an organic light emitting diode (OLED), particularly an OLED containing an Ir complex as a phosphorescent emitter.

BACKGROUND OF THE INVENTION

Electroluminescent phosphorescent materials containing a heavy metal complex, such as Pt, Os and Ir complexes, have gained a lot of attention in the application as an emitter of an OLED due to their highly efficient luminescent property. Among these complexes the Ir complex is the most efficient. The Ir complex usually has a regular octahedron structure at a positive trivalent oxidation state, and its luminescent property mainly comes from a metal-to-ligand charge transfer triplet state-$^3$MLCT or a ligand-based triplet state-$^3(\pi-\pi^*)$ state. A highly efficient electroluminescent phosphorescent emission is caused by the electron configurations of these heavy metal complexes having a strong spin-orbit coupling.

U.S. Patent publication No. 2002/0034656A1 discloses an organometallic complex as an electroluminescent phosphorescent material including an octahedron complex, $L_2MX$, where L and X are distinctive bidentate ligands, and M is Ir or Pt. Among the ligands (L) shown in FIG. 49 thereof, vinylpyridine is one of them. However, this published patent application does not propose the use of an Ir complex with vinylpyridine (L) as a ligand as an electroluminescent phosphorescent material. Furthermore, this published patent application does not actually synthesize the Ir complex having vinylpyridine as a ligand. The disclosure of this published U.S. patent application is incorporated herein by reference.

SUMMARY OF THE INVENTION

A primary objective of the present invention is to provide a phosphorescent Ir complex for use as a light emitting layer of an organic electroluminescent device. The organic electroluminescent device thus fabricated shows high brightness, high external quantum efficiency, high current efficiency, and excellent CIE coordinates.

Another objective of the present invention is to provide an Ir complex for use as a light emitting layer of an electroluminescent device capable of emitting yellow to red light.

The phosphorescent Ir complex according to the present invention is mainly characterized in an octahedral hexaligand complex formed of three bidentate ligands having the following structures (I) or (II):

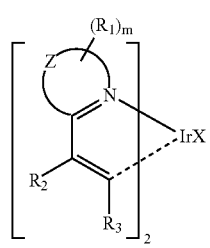

I

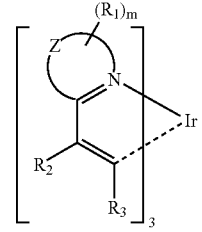

II wherein X is an arbitrary monoanionic bidentate ligand, e.g. acetylacetonate, aminoacid, salicylaldehyde, iminoacetonate, or other form;

Z is an arbitrary atomic moiety capable of forming a nitrogen-containing heterocyclic group such as pyridine, quinoline, isoquinoline, pyrazine, pyrimidine, pyrrole, pyrazole, imidazole, indole, thiazole, isothiazole, oxazole, isoxazole, benzothiazole, benzoxazole, phenanthroline, or other form;

$R_1$ is H, halogen, C1-C6 alkyl (e.g. methyl, ethyl, cyclohexyl), halogen-substituted C1-C6 alkyl (e.g. trifluoro methyl), C1-C6 alkoxy, phenyl C1-C6 alkyl (e.g. benzyl), amino, aryl, or a substituent of another arbitrary form;

m is 0 or a positive integer, the magnitude of which is determined by the size of the nitrogen-containing heterocyclic ring;

$R_2$ and $R_3$ independently are H, halogen, C1-C6 alkyl (e.g. methyl, ethyl, cyclohexyl), halogen-substituted C1-C6 alkyl (e.g. trifluoro methyl), C1-C6 alkoxy, phenyl C1-C6 alkyl (e.g. benzyl), amino, aryl, hetrocyclic aryl, or a substituent of an arbitrary form.

The abovementioned aryl includes: phenyl, naphthyl, diphenyl, anthryl, pyrenyl, phenanthryl, or a polyaryl substituent of other form; the abovementioned hetrocyclic aryl includes: benzofurane, thiophene, or a hetrocyclic aryl of other form.

DETAILED DESCRIPTION OF THE INVENTION

Figure 1:
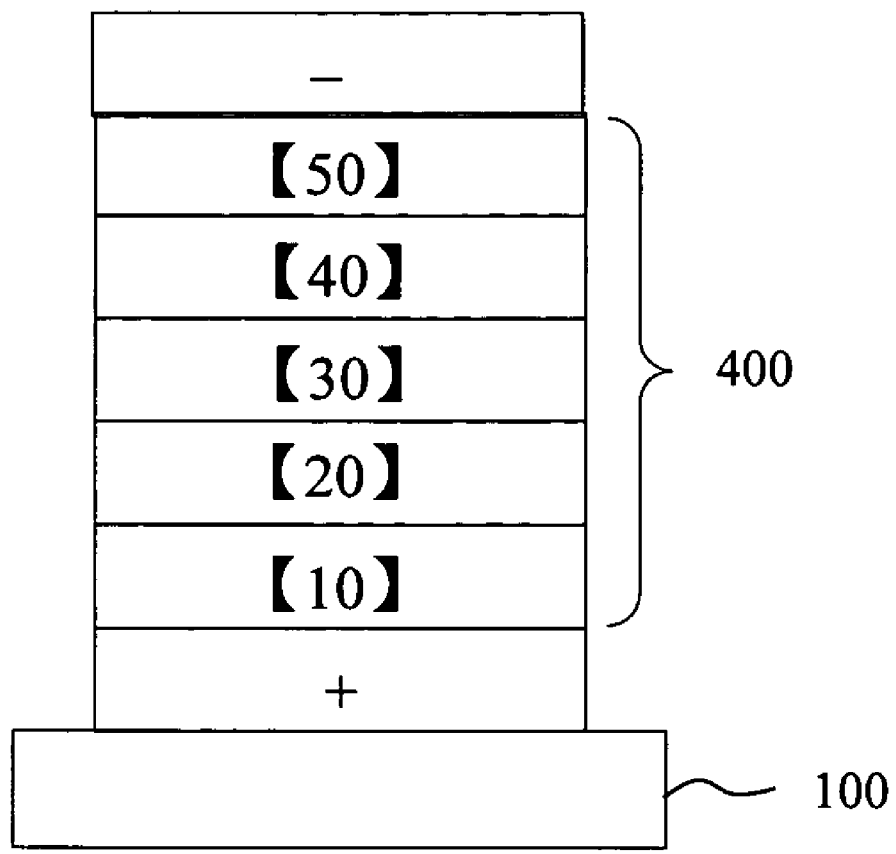
FIG. 1 shows a schematic diagram of a multi-layered OLED of the present invention.

In the following text, the synthesis and spectrum data of the phosphorescent Ir complexes according to the present invention are described in detail, as well as the application of this type of complexes as a phosphorescent material of an organic light-emitting diode (OLED). The structure of an OLED is a two layered, three layered, or multiple layered structure. FIG. 1 is a schematic diagram of a multiple layered OLED device, wherein the actual thickness of each layer is independent of the dimension depicted in the drawing. The structure of the multiple layered OLED device sequentially comprises a substrate (100), an anode (+), a hole injection modification layer (10), a hole transporting layer (20), an electron-blocking layer (not shown in the drawing), a light emitting layer (30), a hole-blocking layer (40), an electron transporting layer (50), and a cathode (−). Said electron-blocking layer, hole injection modification layer (10), and hole-blocking layer (40), depending on the requirements of said device, may or may not be included in the structure thereof, wherein the layers between the positive electrode and the negative electrode constitute an electroluminescent medium (400) of said device. Said light emitting layer (30) is formed by doping a phosphorescence material as a dopant in a host compound.

Preferred Embodiments

EXAMPLE 1

Synthesis of 2-[(E)-2-phenyl-1-ethenyl]pyridine) (PEP)

The synthesis reaction is shown in the following:

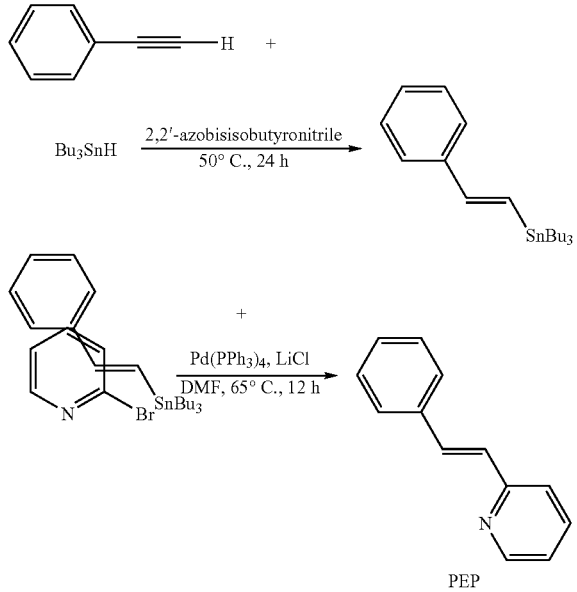

Step (1): The synthesis was carried out according to the methods described in (a) Labadie, J. W.; Tueting, D.; Stille, J. K. *J. Org. Chem.* 1983, 48, 4634 and (b) Lappert, M. F.; Jones, K. *J. Organomet. Chem.* 1965, 3, 295. A mixture of tributyltin hydride (5.82 g, 20.0 mmole), phenylacetylene (1.95 g, 19.0 mmole), and 2,2'-azobis(isobutyronitrile) (0.14 g, 0.085 mmole) was slowly heated to 50° C., followed by stirring for 24 hours. Next, the mixture was cooled to room temperature and filtered by a Celite pad to remove the white precipitate. The filtrate was distilled to obtain 6.50 g of tributyl[(E)-2-phenyl-1-ethenyl]stannane. Yield: 84%.

Step (2): The synthesis method described in Parrain, J. L.; Duchene, A.; Qunitard, J. P. *J. Chem. Soc. Perkin Trans.* 1 1990, 1, 187 was used with modifications. To a mixed solution of Pd(PPh$_3$)$_4$ (0.05 mmole), lithium chloride (LiCl) (2.00 mmole) and 10 ml of DMF, 1.00 mmole of 2-bromopyridine and 1.2 mmole of tributyl[(E)-2-phenyl-1-ethenyl]stannane were added. The mixture was reacted at 65° C. for 12 hours. Next, the reaction mixture was cooled to room temperature, 10 ml of a saturated potassium fluoride solution was added, and agitated at room temperature for 30 minutes. Next, using 50 ml of ether as an eluent, the mixture was filtered by Celite and silica gel. The organic layer was collected, washed with water, dried with magnesium sulfate, and concentrated. The concentrated solution was purified by passing through a silica gel column using ethyl acetate and n-hexane as an eluent, thereby obtaining said title compound. Yield: 75%. $^1$H NMR (CDCl$_3$, 400 MHz): δ (ppm) 7.13-7.21 (m, 2H), 7.26-7.30 (m, 1H), 7.33-7.41 (m, 3H), 7.56-7.69 (m, 4H), 8.58 (d, J=4.4 Hz, 1H).

EXAMPLE 2

Synthesis of 2-[(E)-2-phenyl-1-ethenyl]-5-(trifluoromethyl)pyridine (PETP)

The synthesis reaction is shown in the following:

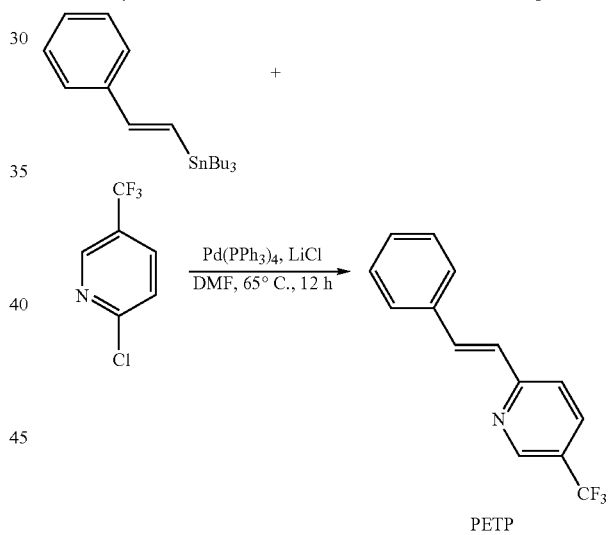

The synthesis steps in Example 1 were followed. Yield: 72%. $^1$H NMR (CDCl$_3$, 400 MHz): δ (ppm) 7.17 (d, J=16.0 Hz, 1H), 7.32 (t, J=7.6 Hz, 1H), 7.38 (t, J=7.2 Hz, 2H), 7.43 (d, J=8.4 Hz, 1H), 7.58 (d, J=7.6 Hz, 2H), 7.74 (d, J=16.0 Hz, 1H), 7.85 (dd, J=2.0 Hz, J=8.8 Hz, 1H), 8.82 (s, 1H).

EXAMPLE 3

Synthesis of 2-[(E)-2-naphthyl-1-ethenyl]pyridine (NEP)

The synthesis reaction is shown in the following:

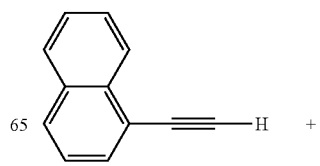

-continued

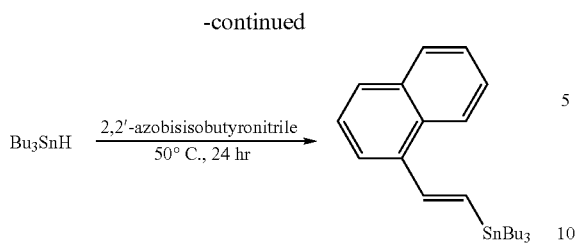

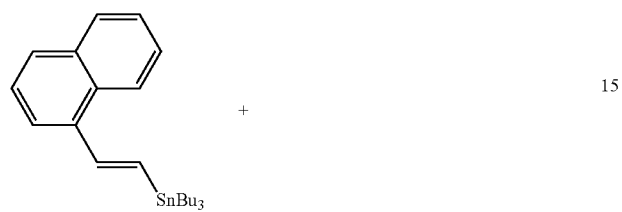

NEP

The synthesis steps in Example 1 were followed. Yield: 72%. $^1$H NMR (CDCl$_3$, 400 MHz): δ (ppm) 7.15-7.19 (m, 2H), 7.42-7.55 (m, 4H), 7.66-7.71 (m, 1H), 7.82-7.87 (m, 3H), 8.31 (d, J=8.4 Hz, 1H), 8.47 (d, J=15.6 Hz, 1H), 8.64 (d, J=4.4 Hz, 1H).

EXAMPLE 4

Synthesis of 2-[(E)-2-phenyl-1-ethenyl]quinoline (PEQ)

The synthesis reaction is shown in the following:

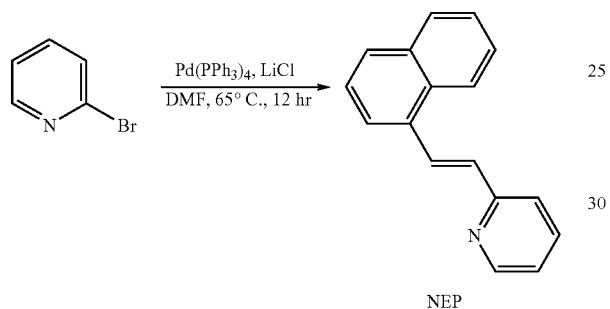

-continued

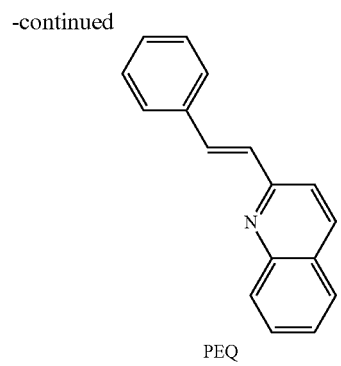

PEQ

The synthesis steps in Example 1 method were followed. Yield: 73%. $^1$H NMR (CDCl$_3$, 400 MHz): δ (ppm) 7.31-7.33 (m, 1H), 7.37-7.41 (m, 3H), 7.48 (td, J=8.0 Hz, J=1.2 Hz, 1H), 7.62-7.71 (m, 5H), 7.76 (d, J=8.0 Hz, 1H), 8.06 (d, J=8.8 Hz, 1H), 8.11 (d, J=8.8 Hz, 1H).

EXAMPLE 5

Synthesis of 4-methyl-2-[(E)-2-phenyl-1-ethenyl] quinoline (MPEQ)

The synthesis reaction is shown in the following:

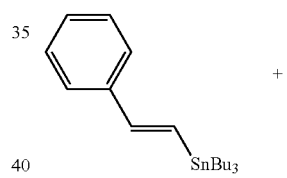

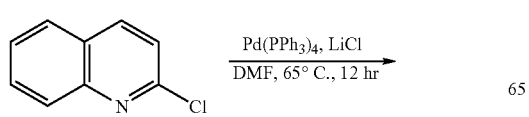

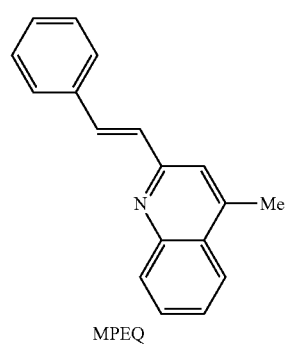

MPEQ

The synthesis steps in Example 1 were followed. Yield: 68%. $^1$H NMR (CDCl$_3$, 400 MHz): δ (ppm) 2.66 (s, 3H), 7.28-7.33 (m, 2H), 7.36-7.39 (m, 2H), 7.46-7.50 (m, 2H), 7.61 (d, J=6.8 Hz, 2H), 7.65-7.69 (m, 2H), 7.90 (d, J=8.0 Hz, 1H), 8.07 (d, J=8.4 Hz, 1H).

EXAMPLE 6

Synthesis of 2-[(E)-2-phenyl-1-ethenyl]-1,3-benzothiazole (PEB)

The synthesis reaction is shown in the following:

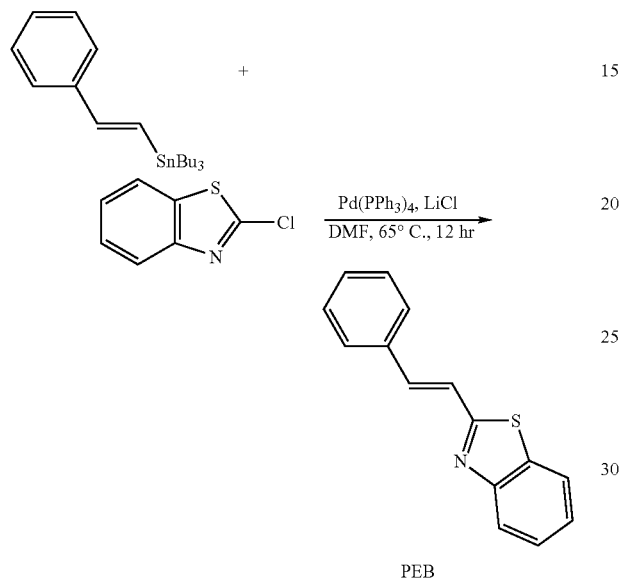

PEB

The synthesis steps in Example 1 method were followed. Yield: 62%. $^1$H NMR (CDCl$_3$, 400 MHz): δ (ppm) 7.34-7.50 (m, 6H), 7.53-7.58 (m, 2H), 7.57 (d, J=7.6 Hz, 1H), 7.84 (d, J=7.6 Hz, 1H), 7.98 (d, J=8.4 Hz, 1H).

EXAMPLE 7

Synthesis of 2-[1-propenyl]pyridine (PP)

The synthesis reaction is shown in the following:

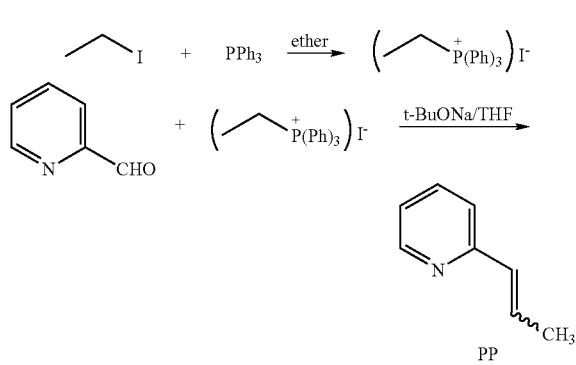

PP

The synthesis was carried out according to the method described in Poulter, C. D.; Muehlbacher, M.; Davis, D. R. *J. Am. Chem. Soc.* 1989, 111, 3740. Step (1): In a nitrogen atmosphere, 25 ml of ether was added into a round bottom flask containing triphenylphosphine (PPh$_3$) (3.60 g, 13.7 mmole). The mixture was agitated until a complete dissolution of PPh$_3$ was obtained. Next, within one minute, ethyl iodide (1.95 g, 12.5 mmole) was slowly added to the solution. The mixture was continuously agitated at room temperature for 48 hours. The resulting white suspension was collected by filtration, and washed with 10 ml of ethyl ether twice, followed by drying in vacuum, thereby obtaining triphenylethyl-phosphonium iodide with a yield of 75%.

Step (2): In a nitrogen atmosphere, 60 ml of freshly distilled THF and sodium tert-butoxide (3.45 g, 35.8 mmole) were introduced into a round bottom flask containing triphenylethyl-phosphonium iodide (11.9 g, 28.6 mmole). The mixture was agitated at room temperature for 1 hour. Next, to the mixture 2-pyridine carboxyaldehyde (2.56 g, 23.9 mmole) was added, and continuously agitated overnight. An ammonium chloride saturate aqueous solution was added to the mixture to terminate the reaction, followed by extraction with ethyl ether. The extract was washed with an ammonium chloride aqueous solution and water, dried with magnesium sulfate, and concentrated in vacuum. The residue was separated with a silica gel chromatography column using ethyl ether and n-hexane as an eluent to obtain a PP trans-isomer with a yield of 28% and a PP cis-isomer with a yield of 35%. (E)-2-[1-propenyl]pyridine: $^1$H NMR (CDCl$_3$, 400 MHz): δ (ppm) 1.90 (d, J=6.4 Hz, 3H), 6.49 (d, J=16.4 Hz, 1H), 6.68-6.74 (m, 1H), 7.03-7.07 (m, 1H), 7.20 (d, J=8.0 Hz, 1H), 7.56 (td, J=7.6 Hz, J=1.6 Hz, 1H), 8.49 (dd, J=4.0 Hz, J=0.8 Hz, 1H).

EXAMPLE 8

Synthesis of 1-[(E)-2-phenyl-1-ethenyl]isoquinoline (PEIQ)

The synthesis reaction is shown in the following:

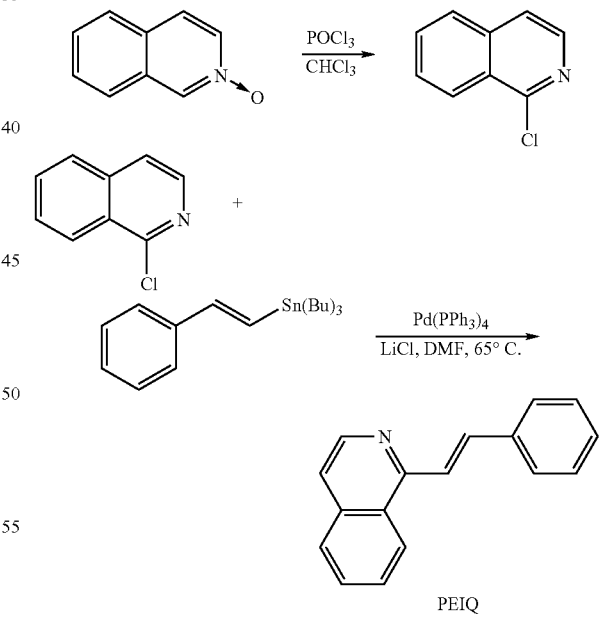

PEIQ

Step (1): The synthesis of 1-chloroisoquinoline was carried out according to the method described in Zhang, H.; Kwong, F. Y.; Tian, Y.; Chan, K. S. *J. Org. Chem.* 1998, 63, 6886. Isoquinoline N-oxide (14.5 g, 0.10 mole) was dissolved in 50 ml of CHCl$_3$. POCl$_3$ (phosphoryl chloride) (28 ml, 0.30 mole) was then added. The resulting mixture was refluxed for two hours and cooled to room temperature. The resulting orange solution was poured into an ice bath. Concentrated ammonia solution was then added until the solution became an alkaline solution. After the solution formed into two layers, the aqueous layer was extracted with 50 ml of dichloromethane twice. The organic layer of the extraction was removed, dried by sodium sulfate, and concentrated in vacuum to obtain a brown oily material. Finally, the residue was purified with a silica gel chromatography column using ethyl ether and n-hexane as an eluent to obtain 14.3 g of a colorless solid with a yield of 84%.

Step (2): The synthesis steps in Example 1 were followed to obtain the title product. Yield: 55%. $^1$H NMR (CDCl$_3$, 400 MHz): δ (ppm) 7.32 (t, J=7.2 Hz, 1H), 7.40 (t, J=7.2 Hz, 2H), 7.55 (t, J=5.6 Hz, 1H), 7.59-7.70 (m, 4H), 7.81 (d, J=8.0 Hz, 1H), 7.98 (d, J=2.0 Hz, 2H), 8.35 (d, J=8.8 Hz, 1H), 8.54 (d, J=5.2 Hz, 1H).

EXAMPLE 9

Synthesis of 5-methyl-2-[(E)-2-phenyl-1-ethenyl]pyridine (5-MPEP)

The synthesis reaction is shown in the following:

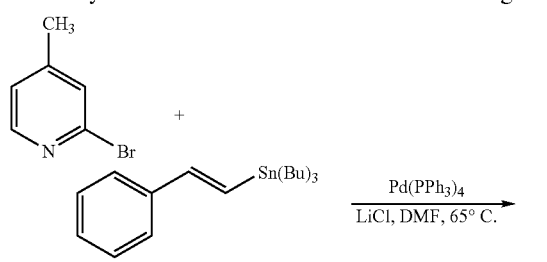

5-MPEP

The synthesis steps in Example 1 were followed. Yield: 58%. $^1$H NMR (CDCl$_3$, 400 MHz): δ (ppm) 2.33 (s, 3H), 6.95 (d, J=5.2 Hz, 1H), 7.12 (d, J=16.0 Hz, 1H), 7.19 (s, 1H), 7.27 (d, J=7.6 Hz, 1H), 7.35 (t, J=7.2 Hz, 2H), 7.55 (d, J=7.2 Hz, 2H), 7.60 (d, J=16.0 Hz, 1H), 8.43 (d, J=4.4 Hz, 1H).

EXAMPLE 10

Synthesis of 2-(1-methyl-2-phenyl-1-ethenyl)pyridine (2-MPEP)

The synthesis reaction is shown in the following:

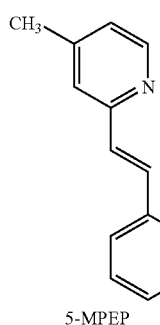

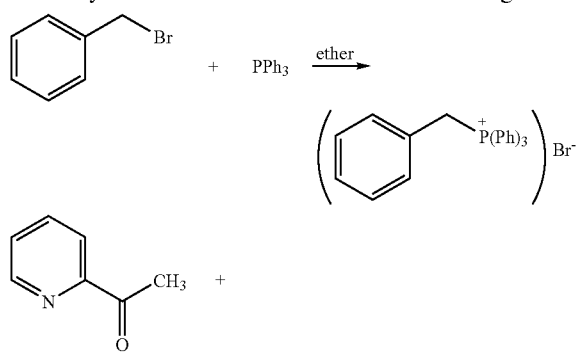

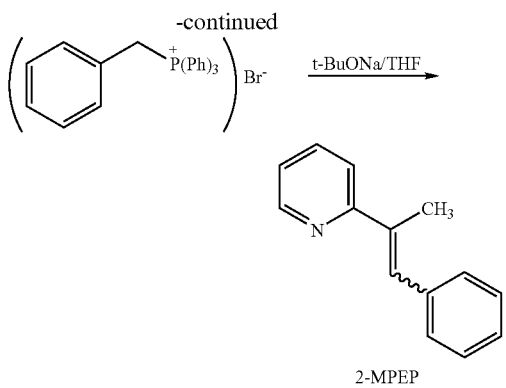

2-MPEP

The synthesis steps in Example 1 were followed. Yield: 71%. $^1$H NMR (CDCl$_3$, 400 MHz): δ (ppm) 2.34 (s, 3H), 7.16 (t, J=6.4 Hz, 1H), 7.25 (t, J=7.2 Hz, 1H), 7.35-7.42 (m, 4H), 7.45 (s, 1H), 7.53 (d, J=8.0 Hz, 1H), 7.68 (td, J=8.0 Hz, 1.6 Hz, 1H), 8.64 (d, J=6.0 Hz, 1H).

EXAMPLE 11

Synthesis of Ir Complex (L)$_2$Ir(acac)

The synthesis reaction is shown in the following:

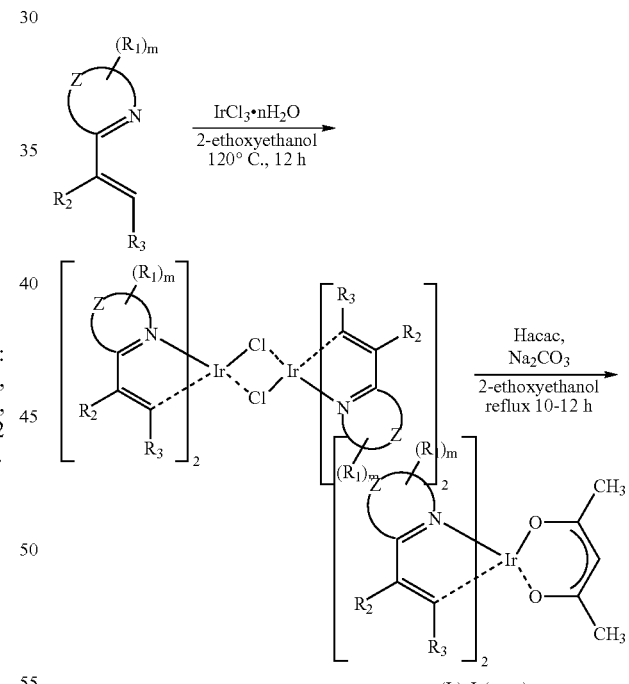

(L)$_2$Ir(acac)

2.2 mmoles of each of the compounds obtained from Examples 1~10 was dissolved in 10 ml of 2-ethoxyethanol. Next, 1 mmole of iridium trichloride hydrate and 3 ml of water were added. In a nitrogen atmosphere, the mixture was stirred at 120° C. for 12 hours. After cooling to room temperature, the resulting precipitate was collected, washed with ethanol and acetone, and dried in vacuo to obtain a cyclometalated Ir(III)-µ-chloro-bridged dimer. Next, the dimer, 5 mmoles of acetylacetonate, and 10 mmoles of sodium carbonate were dissolved in 15 ml of 2-ethoxy ethanol. In a nitrogen atmosphere, the mixture was refluxed at 120° C. for 12 hours. After being cooled to room temperature, 2-ethoxy ethanol was removed by distillation. The residue was dissolved in dichloromethane and filtered to remove sodium carbonate. The filtrate was concentrated in vacuo. The residue was purified with a silica gel chromatography column using dichloromethane and n-hexane as an eluent to obtain an Ir complex. Prior to the fabrication of a device, the Ir complex was further purified by sublimation at 200-220° C. and $4 \times 10^{-3}$ Pa.

EXAMPLE 12

Figure 2:
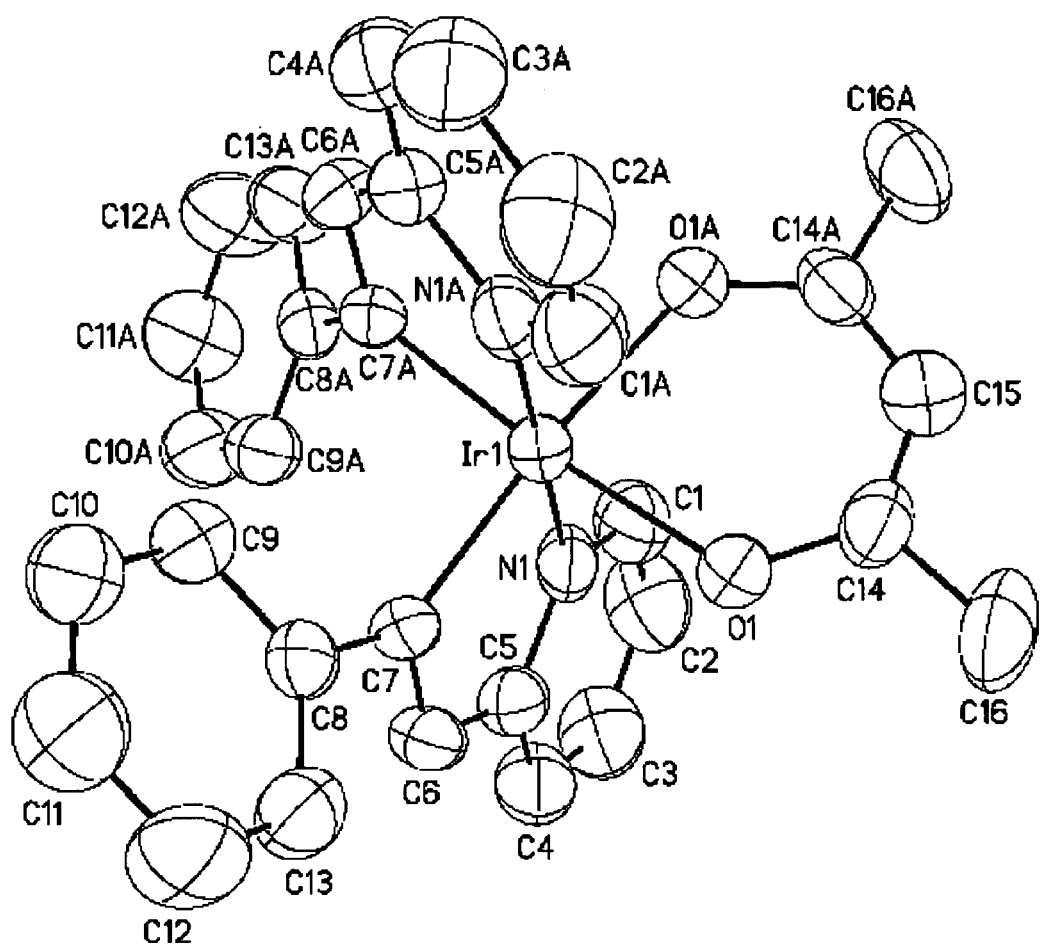
FIG. 2 shows the x-ray structure and the molecular formula of an Ir complex synthesized in Example 12 according to the present invention.
Figure 2:
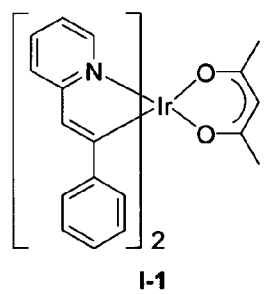

Synthesis of (PEP)$_2$Ir(acac) (I-1) (X-ray Structure and Molecular Formula are Shown in FIG. 2)

Figure 3:
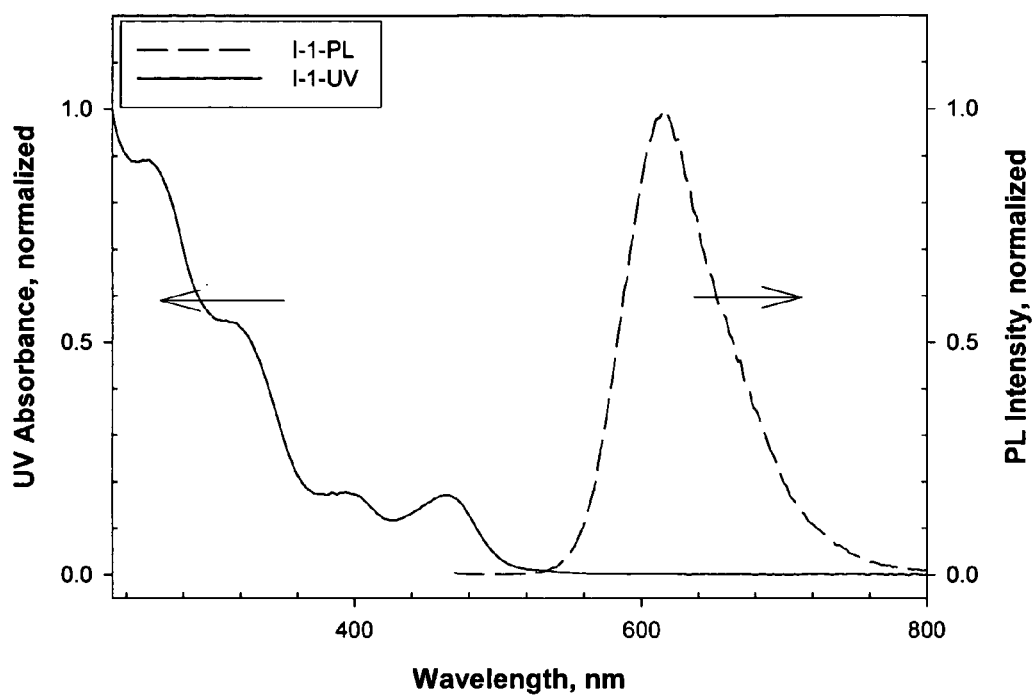
FIG. 3 shows the UV absorption spectrum and the PL emission spectrum of the Ir complex of FIG. 2 dissolved in dichloromethane.

PEP obtained from Example 1 was used as a ligand (L). The steps in Example 11 were used to prepare a complex I-1 with a yield of 72%. The ultraviolet absorption spectrum and the photoluminescence (PL) emission spectrum of the I-1 complex dissolved in dichloromethane are shown in FIG. 3. The emission light is red and the maximum emission wavelength is 616 nm. $^1$H NMR (CDCl$_3$, 500 MHz): δ (ppm) 1.81 (s, 6H), 5.12 (s, 1H), 6.56 (td, J=1.5 Hz, J=6.0 Hz, 2H), 6.73 (s, 2H), 6.91 (d, J=5.0 Hz, 10H), 7.09 (d, J=8.0 Hz, 2H), 7.29 (td, J=1.5 Hz, J=7.5 Hz, 2H), 7.78 (d, J=6.0 Hz, 2H); HRMS (m/z) calcd for C$_{31}$H$_{27}$IrN$_2$O$_2$ 652.1702, found 652.1699.

EXAMPLE 13

Figure 4:
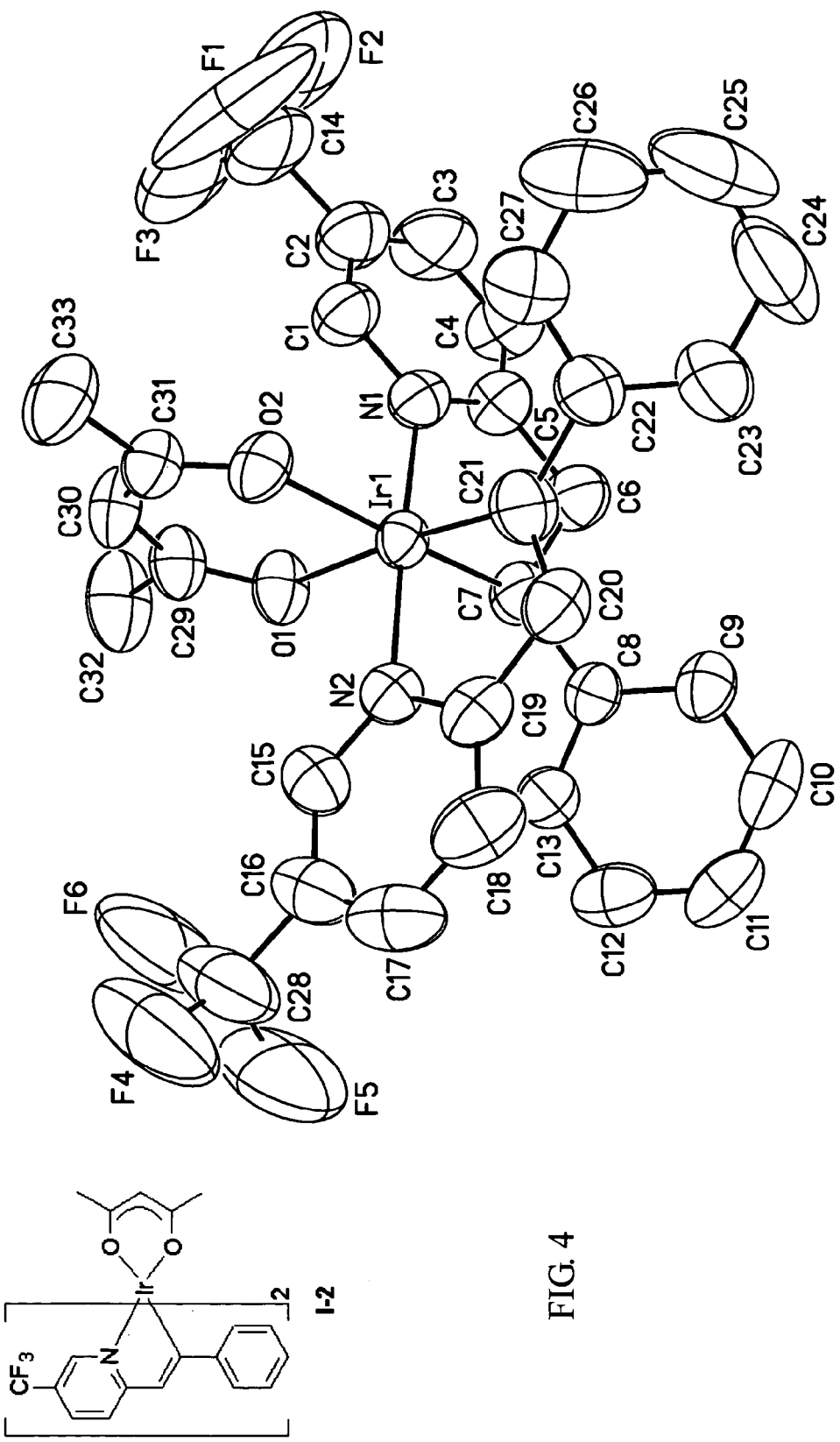
FIG. 4 shows the x-ray structure and the molecular formula of an Ir complex synthesized in Example 13 according to the present invention.

Synthesis of (PETP)$_2$Ir(acac) (I-2) (X-ray Structure and Molecular Formula are Shown in FIG. 4)

Figure 5:
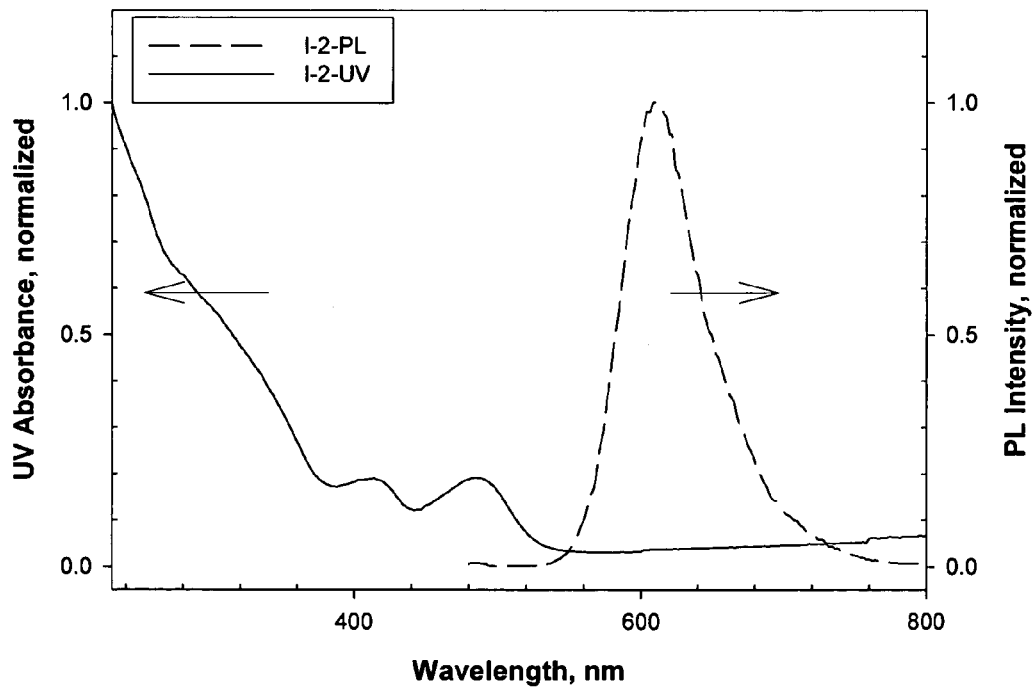
FIG. 5 shows the UV absorption spectrum and the PL emission spectrum of the Ir complex of FIG. 4 dissolved in dichloromethane.

PETP obtained from Example 2 was used as a ligand (L). The steps in Example 11 were used to prepare a complex I-2 with a yield of 70%. The ultraviolet absorption spectrum and the PL emission spectrum of the I-2 complex dissolved in dichloromethane are shown in FIG. 5. The emission light is red and the maximum wavelength of the emission light is 610 nm. $^1$H NMR (CDCl$_3$, 400 MHz): δ(ppm) 1.85 (s, 6H), 5.17 (s, 1H), 6.76 (s, 2H), 6.81-6.84 (m, 4H), 6.92-6.96 (m, 6H), 7.14 (d, J=8.4 Hz, 2H), 7.45 (d, J=8.4 Hz, 2H), 7.93 (s, 2H); HRMS (m/z) calcd for C$_{33}$H$_{25}$F$_6$IrN$_2$O$_2$ 788.1449, found 788.1451.

EXAMPLE 14

Synthesis of (NEP)$_2$Ir(acac) (I-3)

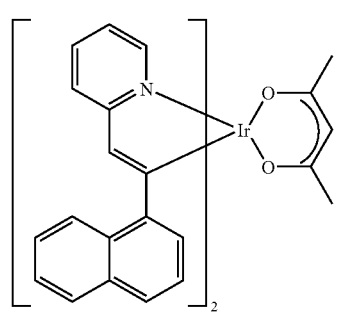

I-3

Figure 6:
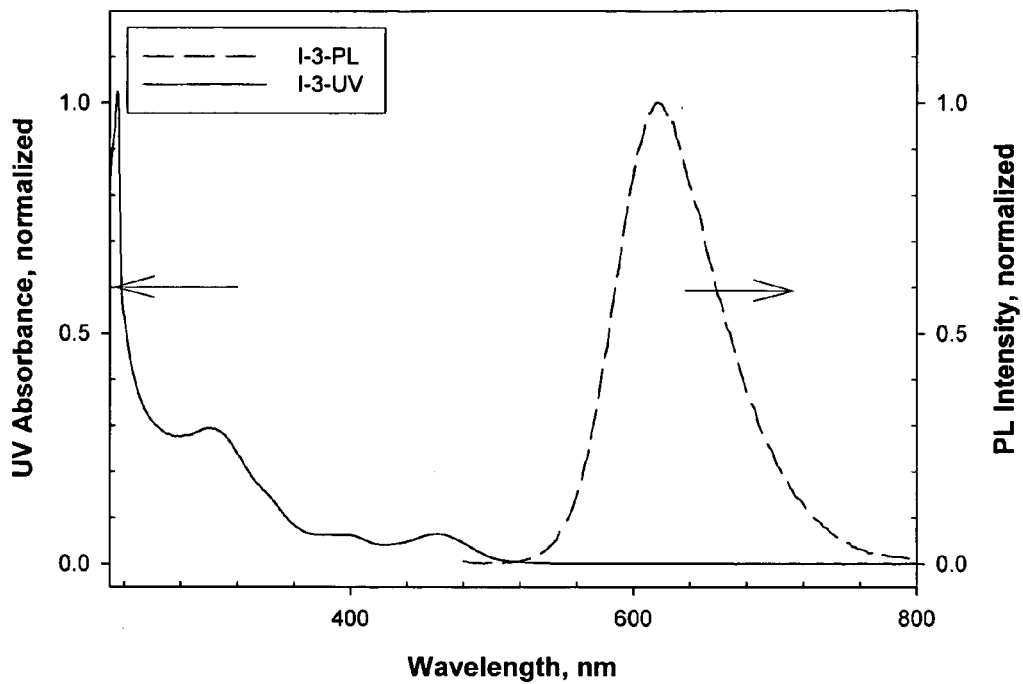
FIG. 6 shows the UV absorption spectrum and the PL emission spectrum of the Ir complex synthesized in Example 14 and dissolved in dichloromethane.

NEP obtained from Example 3 was used as a ligand (L). The steps of Example 11 were used to prepare a complex I-3 with a yield of 61%. The ultraviolet absorption spectrum and the PL emission spectrum of the I-3 complex dissolved in dichloromethane are shown in FIG. 6. The emission light is red and the maximum emission wavelength is 616 nm. $^1$H NMR (CDCl$_3$, 400 MHz): δ (ppm) 1.88 (s, 6H), 5.13 (s, 1H), 6.01 (t, J=6.4 Hz, 2H), 6.79 (s, 2H), 6.86 (d, J=6.4 Hz, 2H), 7.02-7.08 (m, 6H), 7.34-7.44 (m, 8H), 7.65 (d, J=6.0 Hz, 2H), 8.56 (d, J=6.0 Hz, 2H); HRMS (m/z) calcd for C$_{39}$H$_{31}$IrN$_2$O$_2$ 752.2015, found 752.2018.

EXAMPLE 15

Synthesis of (PEQ)$_2$Ir(acac) (I-4)

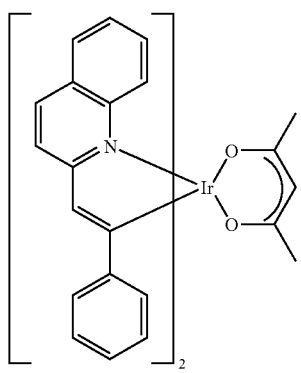

I-4

Figure 7:
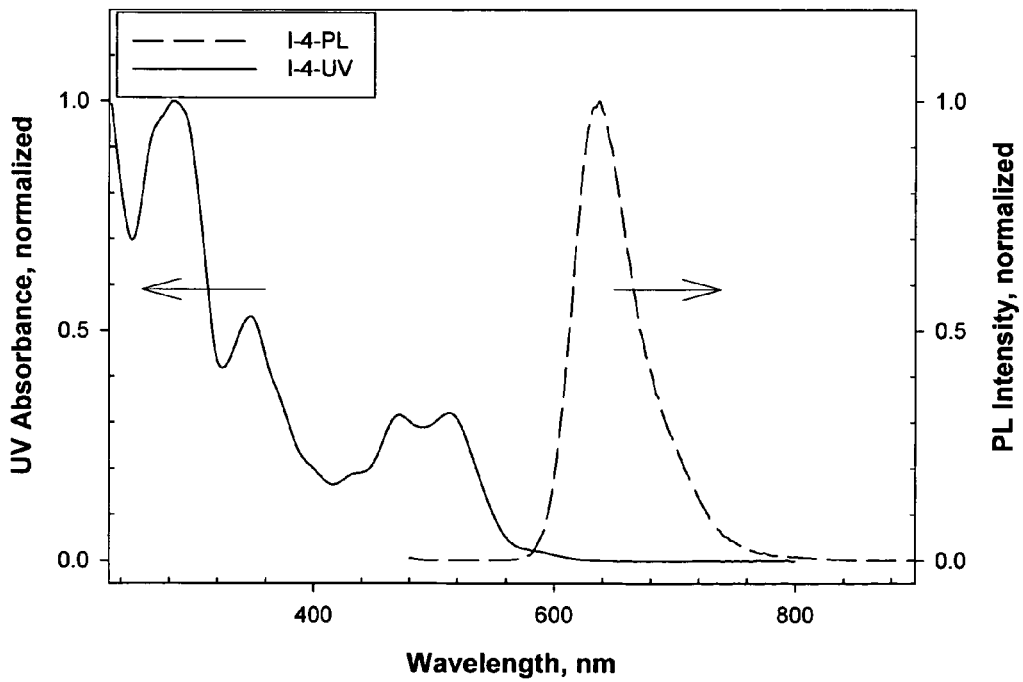
FIG. 7 shows the UV absorption spectrum and the PL emission spectrum of the Ir complex synthesized in Example 15 and dissolved in dichloromethane.

PEP obtained from Example 4 was used as a ligand (L). The steps of Example 11 were used to prepare a complex I-4 with a yield of 60%. The ultraviolet absorption spectrum and the PL emission spectrum of the I-4 complex dissolved in dichloromethane are shown in FIG. 7. The emission light is red and the maximum wavelength of the emission light is 638 nm. $^1$H NMR (CDCl$_3$, 400 MHz): δ (ppm) 1.60 (s, 6H), 4.60 (s, 1H), 6.70-6.72 (m, 6H), 7.02 (dd, J=6.8 Hz, J=3.2 Hz, 4H), 7.09-7.13 (m, 4H), 7.43 (dd, J=6.8 Hz, J=3.6 Hz, 2H), 7.49 (d, J=9.6 Hz, 2H), 7.54 (s, 2H), 7.75 (dd, J=6.8 Hz, J=2.8 Hz, 2H), 7.80 (d, J=8.0 Hz, 2H). HRMS (m/z) calcd for C$_{39}$H$_{31}$IrN$_2$O$_2$ 752.2015, found 752.2022.

EXAMPLE 16

Synthesis of (MPEQ)$_2$Ir(acac) (I-5)

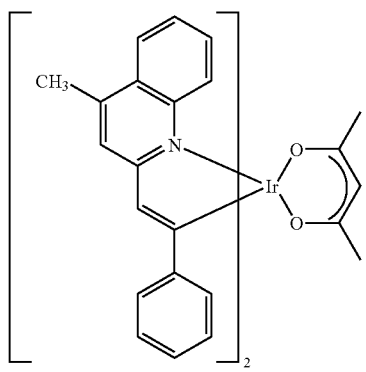

I-5

Figure 8:
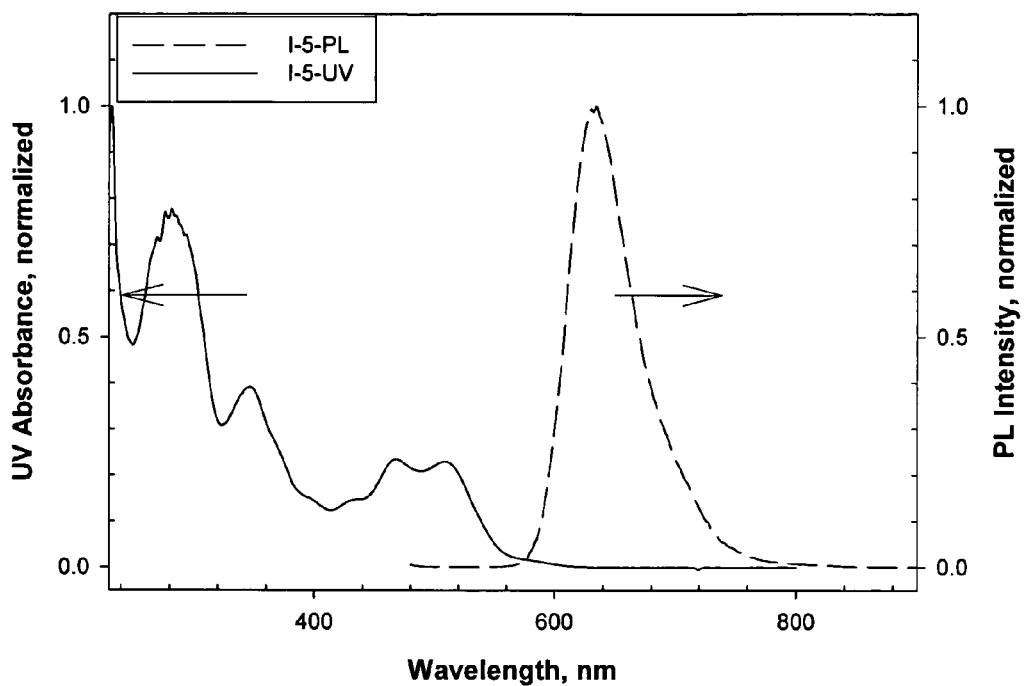
FIG. 8 shows the UV absorption spectrum and the PL emission spectrum of the Ir complex synthesized in Example 16 and dissolved in dichloromethane.

MPEQ obtained from Example 5 was used as a ligand (L). The steps of Example 11 were used to prepare a complex I-5 with a yield of 59%. The ultraviolet absorption spectrum and the PL emission spectrum of the I-5 complex dissolved in dichloromethane are shown in FIG. 8. The emission light is red and the maximum wavelength of the emission light is 634 nm. $^1$H NMR (CDCl$_3$, 400 MHz): (ppm) 1.58 (s, 6H), 1.66 (s, 6H), 4.57 (s, 1H), 6.71 (dd, J=2.4 Hz, 6.0 Hz, 6H), 7.02-7.12 (m, 6H), 7.15 (t, J=6.4 Hz, 2H), 7.35 (s, 2H), 7.49 (s, 2H), 7.59 (d, J=8.0 Hz, 2H), 7.74 (d, J=8.0 Hz, 2H). HRMS (m/z) calcd for C$_{41}$H$_{35}$IrN$_2$O$_2$ 780.2328, found 780.2323.

EXAMPLE 17

Synthesis of (PEB)$_2$Ir(acac)(I-6)

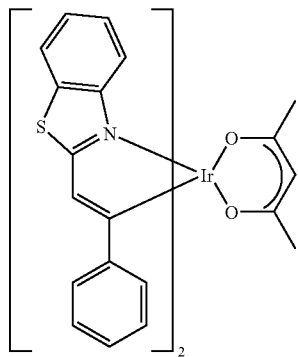

I-6

Figure 9:
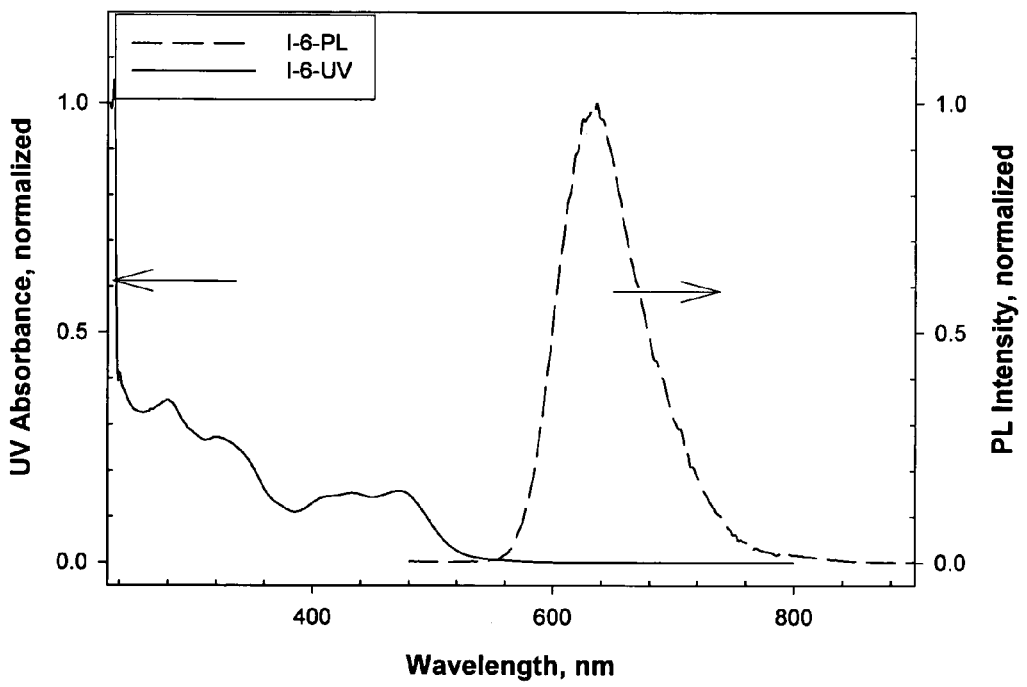
FIG. 9 shows the UV absorption spectrum and the PL emission spectrum of the Ir complex synthesized in Example 17 and dissolved in dichloromethane.

PEB obtained from Example 6 was used as a ligand (L). The steps of Example 11 were used to prepare a complex I-6 with a yield of 81%. The ultraviolet absorption spectrum and the PL emission spectrum of the I-6 complex dissolved in dichloromethane are shown in FIG. 9. The emission light is red and the maximum emission wavelength is 636 nm. $^1$H NMR (CDCl$_3$, 400 MHz): (ppm) 1.77 (s, 6H), 4.96 (s, 1H), 6.74-6.78 (m, 6H), 6.87 (dd, J=2.8 Hz, J=7.6 Hz, 4H), 7.04-7.08 (m, 6H), 7.37 (dd, J=2.8 Hz, J=8.4 Hz, 2H), 7.54 (dd, J=2.4 Hz, J=7.6 Hz, 2H). HRMS (m/z) calcd for C$_{35}$H$_{27}$IrN$_2$O$_2$S$_2$ 764.1143, found 764.1151.

EXAMPLE 18

Synthesis of (PP)$_2$Ir(acac) (I-7)

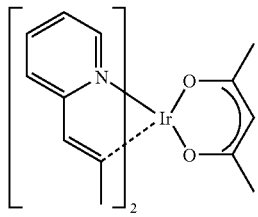

I-7

Figure 10:
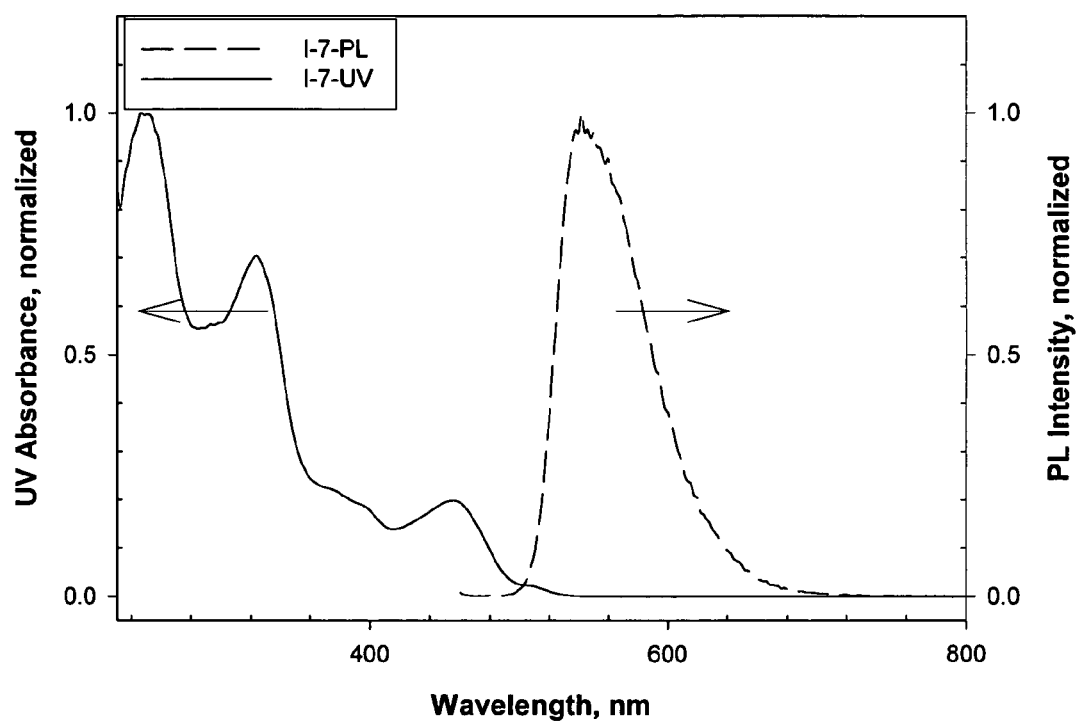
FIG. 10 shows the UV absorption spectrum and the PL emission spectrum of the Ir complex synthesized in Example 18 and dissolved in dichloromethane.

PP obtained from Example 7 was used as a ligand (L). The steps of Example 11 were used to prepare a complex I-7 with a yield of 20%. The ultraviolet absorption spectrum and the PL emission spectrum of the I-7 complex dissolved in dichloromethane are shown in FIG. 10. The emission light is yellow and the maximum wavelength of the emission light is 542 nm. $^1$H NMR (CDCl$_3$, 400 MHz): (ppm) 1.64 (s, 6H), 1.79 (s, 6H), 5.12 (s, 1H), 6.45 (s, 2H), 6.76 (td, J=6.8 Hz, J=0.8 Hz, 2H), 7.12 (d, J=8.0 Hz, 2H), 7.41 (td, J=8.4 Hz, J=1.6 Hz, 2H), 8.11 (d, J=5.6 Hz, 2H).

EXAMPLE 19

Synthesis of (PEIQ)$_2$Ir(acac) (I-8)

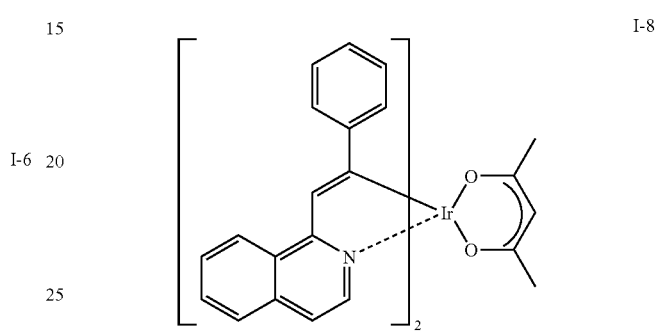

I-8

PEIQ obtained from Example 8 was used as a ligand (L). The steps of Example 11 were used to prepare a complex I-8 with a yield of 50%. The PL emission spectrum of the I-8 complex dissolved in dichloromethane shows red light with an emission maximum at 664 nm. $^1$H NMR (CDCl$_3$, 400 MHz) (ppm): 1.81 (s, 6H), 5.13 (s, 1H), 6.82-6.89 (m, 6H), 6.96-7.03 (m, 6H), 7.48 (td, J=6.8 Hz, J=1.2 Hz, 2H), 7.55 (td, J=7.0 Hz, 1.6 Hz, 2H), 7.67 (t, J=6.4 Hz, 6H), 8.27 (d, J=8.4 Hz, 2H).

EXAMPLE 20

Synthesis of (5-MPEP)$_2$Ir(acac) (I-9)

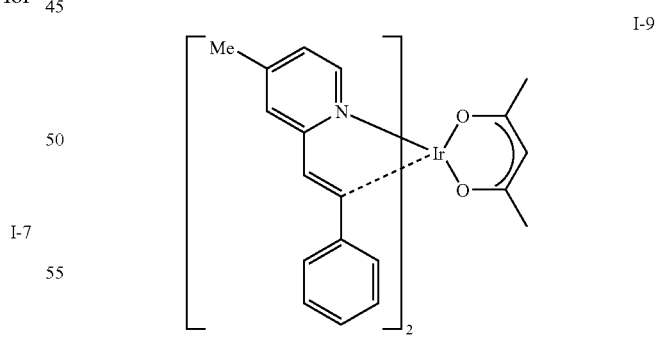

I-9

5-MPEP obtained from Example 9 was used as a ligand (L). The steps of Example 11 were used to prepare a complex I-9 with a yield of 62%. The PL emission spectrum of the I-9 complex dissolved in dichloromethane gives red light with the maximum emission wavelength at 616 nm. $^1$H NMR (CDCl$_3$, 400 MHz): (ppm) 1.80 (s, 6H), 2.33 (s, 6H), 5.10 (s, 1H), 6.40 (d, J=6.0 Hz, 2H), 6.67 (s, 2H), 6.91-6.95 (m, 12H), 7.62 (d, J=5.6 Hz, 2H).

EXAMPLE 21

Synthesis of (2-MPEP)$_2$Ir(acac) (I-10)

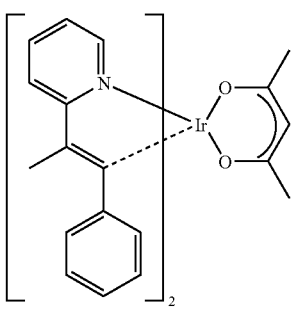

I-10

2-MPEP obtained from Example 10 was used as a ligand (L). The steps of Example 11 were used to prepare a complex I-10 with a yield of 72%. The solution of the I-10 complex dissolved in dichloromethane emits red light and the maximum emission wavelength is 612 nm. $^1$H NMR (CDCl$_3$, 400 MHz): (ppm) 1.80 (s, 6H), 1.82 (s, 6H), 5.13 (s, 1H), 6.53 (td, J=7.2 Hz, J=0.8 Hz, 2H), 6.79-6.95 (m, 12H), 7.24 (td, J=7.6 Hz, J=0.8 Hz, 2H), 7.81 (dd, J=5.2 Hz, J=0.8 Hz, 2H).

EXAMPLE 22~EXAMPLE 47

Fabrication of Organic Light Emitting Diode Device

The phosphorescent Ir complexes of the present invention synthesized above were used to prepare OLED devices. The devices were all fabricated according to the following steps: preparing a glass substrate; sequentially forming an anode, a hole injection modification layer (optional), a hole transporting layer, a light emitting layer, a hole-blocking layer, an electron transporting layer, a hole injection layer (KF, potassium fluoride) (optional), and a cathode. The anode was made of electrically conductive ITO (Indium-Tin-Oxide) with a thickness of about 100 nm. The light emitting layer was formed by doping the phosphorescent Ir complex in the host material. Prior to performing a vapor deposition of the organic layers, the ITO glass was cleaned first by using a commercial detergent and an organic solvent, followed by an UV-ozone cleaner.

The material used as a hole injection modification layer in the device of the present invention was selected from m-MTDATA (4,4',4"-tris[N-(3-methylphenyl)-N-phenylamino]triphenylamine) and 2-TNATA (4,4',4"-tris[2-naphthylphenylamino]triphenylamine) as shown in the following structure group G1:

Structure group G1

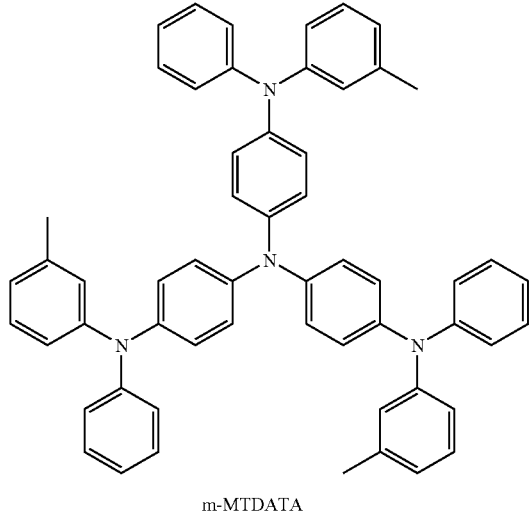

m-MTDATA

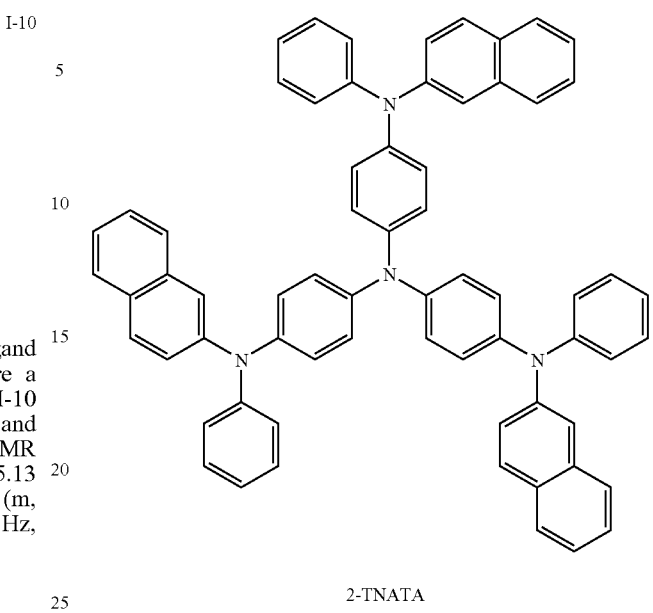

2-TNATA

The hole transporting material was an aniline compound selected from the following structure group G2 consisting of NPB (4,4'-bis[1-naphthylphenylamino]biphenyl), TPD (4,4'-bis[m-tolylphenylamino]biphenyl), NCB (4-[N-carbazolyl]-4'-[N-phenylnaphthylamino]biphenyl), PPB (4,4'-bis[9-phenanthrylphenylamino]biphenyl), TCTA (4,4',4"-tri[N-carbazolyl]triphenylamine), MPMP (bis{4-[N,N-diethylamino]-2-[methylphenyl]}-[4-methylphenyl] methane) and HMTPD (4,4'-bis{N,N'-[3-tolyl]amino}-3,3'-dimethylbiphenyl):

Structure group G2

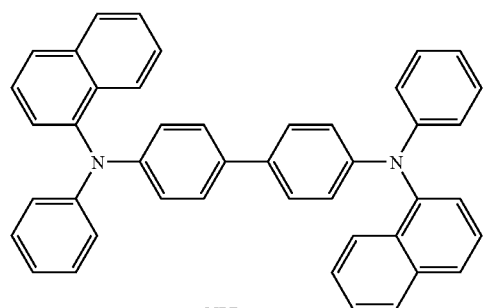

NPB

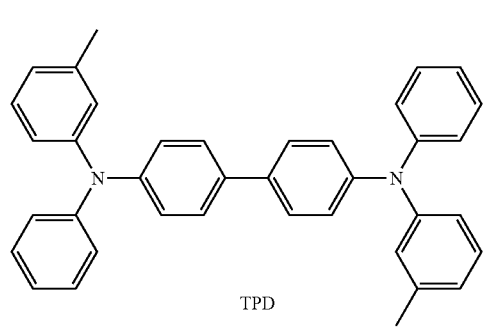

TPD

-continued

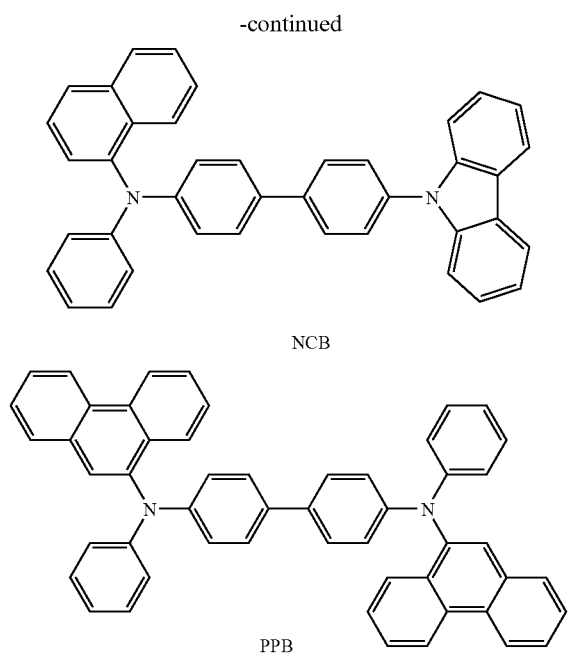

NCB

PPB

MPMP

HMTPD

-continued

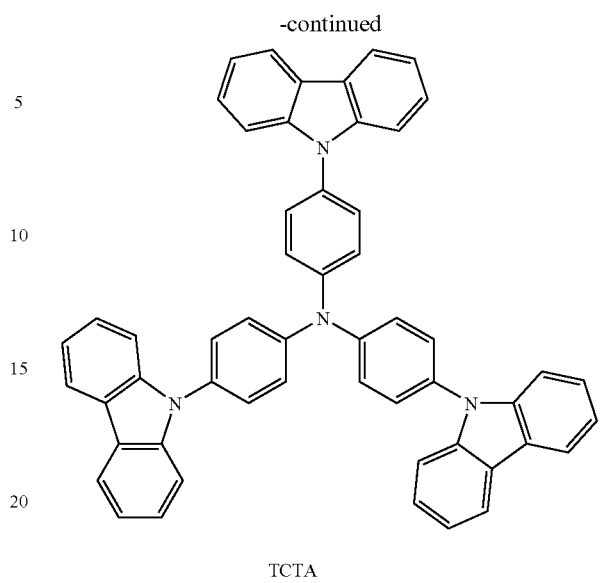

TCTA

The host material was selected from TCTA in the structure group G2, or the compounds having a hole transporting capability such as CBP (4,4'-N,N'-dicarbazole-biphenyl), CCP (1,4-bis[carbazolyl]benzene), TCPB (1,3,5-tris[4-(N-carbazolyl)phenyl]benzene) of the following structure group G3, or the compounds having electron transporting capability such as TPBI (1,3,5-tris[N-phenylbenzimidazol-2-yl]benzene), TAZ-1 (3-phenyl-4-[1'-naphthyl]-5-phenyl-1,2,4-triazole), TAZ-2 (3-[4-biphenylyl]-4-phenyl-5-tert-butylphenyl-1,2,4-triazole), TAZ-3 (3-phenyl-4-[1'-phenyl]-5-phenyl-1,2,4-triazole), PBD (2-[4-biphenyl]-5-[4-tert-butylphenyl]-1,3,4-oxadiazole) of the following structure group G3:

Structure group G3

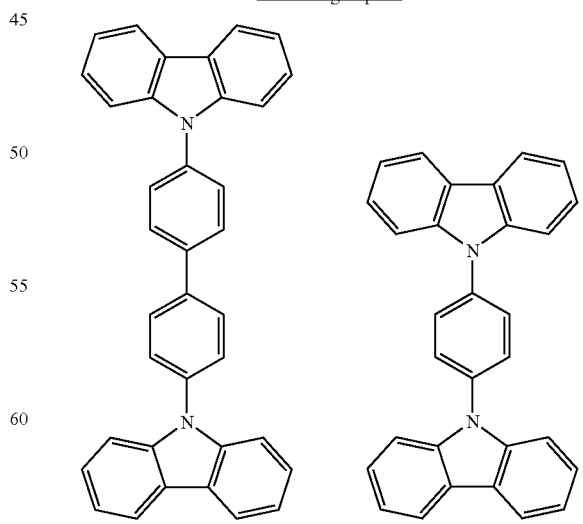

CBP           CCP

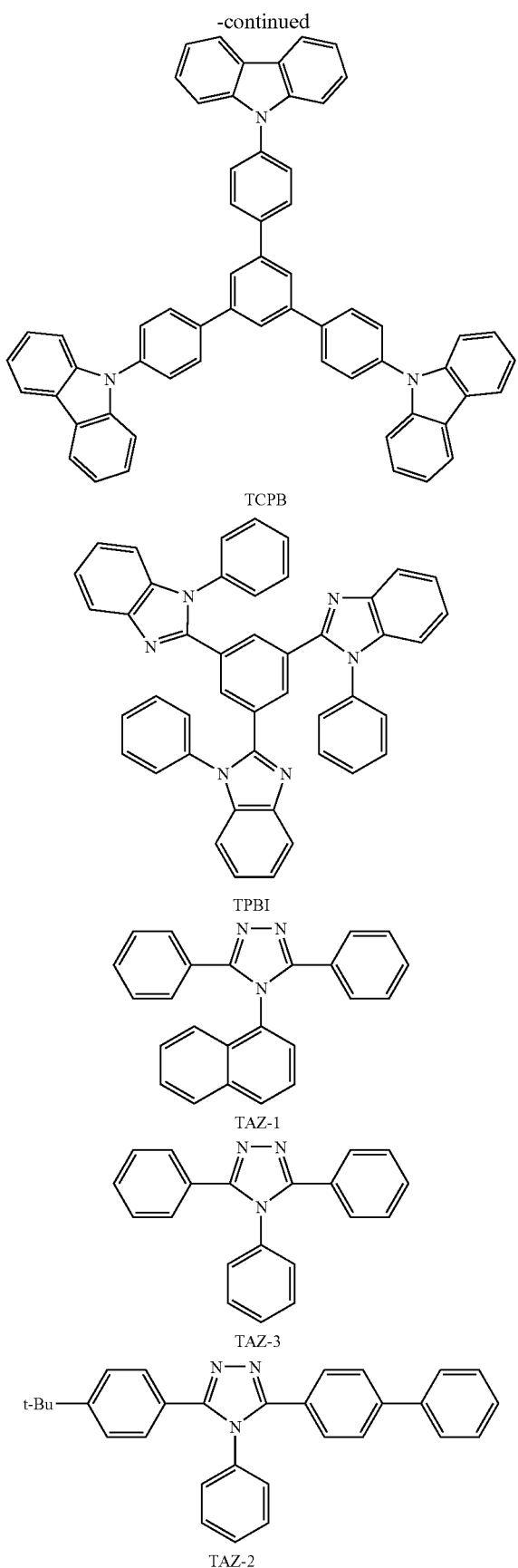

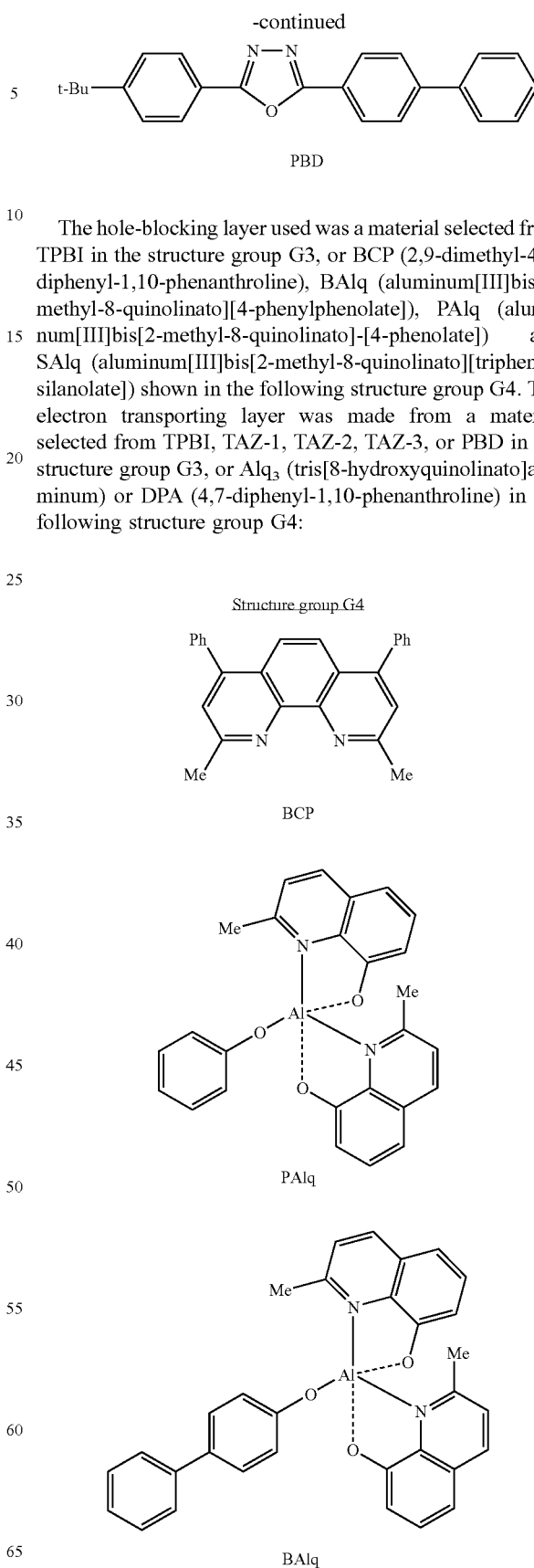

The hole-blocking layer used was a material selected from TPBI in the structure group G3, or BCP (2,9-dimethyl-4,7-diphenyl-1,10-phenanthroline), BAlq (aluminum[III]bis[2-methyl-8-quinolinato][4-phenylphenolate]), PAlq (aluminum[III]bis[2-methyl-8-quinolinato]-[4-phenolate]) and SAlq (aluminum[III]bis[2-methyl-8-quinolinato][triphenylsilanolate]) shown in the following structure group G4. The electron transporting layer was made from a material selected from TPBI, TAZ-1, TAZ-2, TAZ-3, or PBD in the structure group G3, or Alq$_3$ (tris[8-hydroxyquinolinato]aluminum) or DPA (4,7-diphenyl-1,10-phenanthroline) in the following structure group G4:

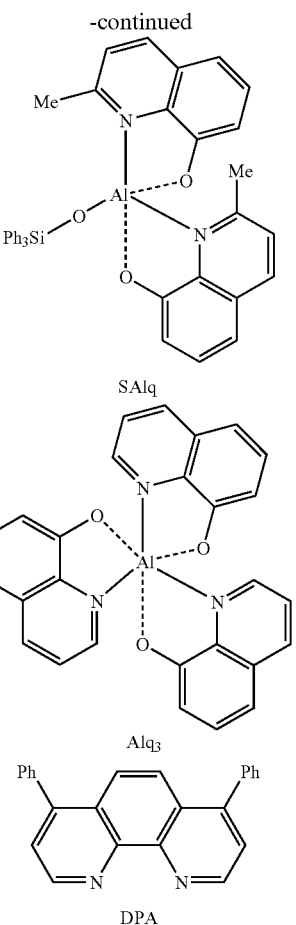

In the structure groups G2-G4, Ph is phenyl, Me is methyl, Et is ethyl, and Bu is butyl.

During the vapor depositions of the organic materials, phosphorescent Ir complexes and metals in the fabrication of devices, the chamber pressure was kept smaller than about $5\times10^{-6}$ torr. The deposition rate was about 1.5~2.5 Å/s for the organic materials, about 0.05~0.2 Å/s for the phosphorescent Ir complexes, and about 0.5 Å/s for potassium fluoride. The layer thickness was about 10~15 nm for the hole injection modification layer, about 25~50 nm for the hole transporting layer, about 10~20 nm for the hole-blocking layer, about 10~50 nm for the electron transporting layer, and about 0.5 nm for the electron injection layer (potassium fluoride). The cathode was a Mg—Ag alloy wherein the depostion rate was 5 Å/s for magnesium and 0.5 Å/s for silver, and the magnesium and silver were deposited by co-evaporation in a ratio of 10 to 1 with a layer thickness of 55 nm. Finally, silver was deposited as a protective layer with a layer thickness of about 100~150 nm. The key characteristics for all devices (Example 22~Example 47) are listed in Table 1 and the structures of the devices are shown in the following:

EXAMPLE 22

ITO/NPB (50 nm)/I-1: CBP (6.7%, 30 nm)/TPBI (10 nm)/Alq (40 nm)/Mg:Ag=10:1

EXAMPLE 23

ITO/NPB (50 nm)/I-1: CBP (14.3%, 30 nm)/TPBI (10 nm)/Alq (40 nm)/Mg:Ag=10:1

EXAMPLE 24

ITO/NPB (50 nm)/I-1: CCP (5.7%, 30 nm)/BCP (10 nm)/Alq (40 nm)/Mg:Ag=10:1

EXAMPLE 25

ITO/NPB (50 nm)/I-1: TPBI (8%, 30 nm)/Alq (40 nm)/Mg:Ag=10:1

EXAMPLE 26

ITO/NPB (25 nm)/I-2: CCP (2.7%, 30 nm)/BCP (10 nm)/Alq (40 nm)/Mg:Ag=10:1

EXAMPLE 27

ITO/NPB (30 nm)/I-2: CCP (5%, 30 nm)/BCP (10 nm)/Alq (40 nm)/Mg:Ag=10:1

EXAMPLE 28

ITO/NPB (50 nm)/I-2: CCP (7.3%, 30 nm)/BCP (10 nm)/Alq (40 nm)/Mg:Ag=10:1

EXAMPLE 29

ITO/NPB (50 nm)/I-2: CCP (9.7%, 30 nm)/BCP (10 nm)/Alq (40 nm)/Mg:Ag=10:1

EXAMPLE 30

ITO/2-TNATA (10 nm)/NPB (30 nm)/I-2: CCP (5%, 30 nm)/BCP (10 nm)/Alq (40 nm)/Mg:Ag=10:1

EXAMPLE 31

ITO/NPB (50 nm)/I-4: CBP (5.7%, 30 nm)/BCP (10 nm)/Alq (40 nm)/Mg:Ag=10:1

EXAMPLE 32

ITO/NPB (50 nm)/I-4: CBP (7.3%, 30 nm)/TPBI (10 nm)/Alq (40 nm)/Mg:Ag=10:1

EXAMPLE 33

ITO/2-TNATA (10 nm)/NPB (40 nm)/I-4: CBP (5.7%, 30 nm)/BCP (10 nm)/Alq (40 nm)/Mg:Ag=10:1

EXAMPLE 34

ITO/2-TNATA (10 nm)/NPB (40 nm)/I-4: CBP (7.3%, 30 nm)/BCP (10 nm)/Alq (40 nm)/Mg:Ag=10:1

EXAMPLE 35

ITO/2-TNATA (10 nm)/NPB (40 nm)/I-4: CBP (10.3%, 30 nm)/BCP (10 nm)/Alq (40 nm)/Mg:Ag=10:1

EXAMPLE 36

ITO/NPB (50 nm)/I-4: CCP (6%, 30 nm)/BCP (10 nm)/Alq (40 nm)/Mg:Ag=10:1

EXAMPLE 37

ITO/2-TNATA (10 nm)/NPB (40 nm)/I-4: CCP (6.7%, 30 nm)/BCP (10 nm)/Alq (40 nm)/Mg:Ag=10:1

EXAMPLE 38

ITO/NPB (30 nm)/CBP (20 nm)/I-4: TPBI (6.7%, 30 nm)/Alq (40 nm)/Mg:Ag=10:1

EXAMPLE 39

ITO/2-TNATA (10 nm)/NPB (40 nm)/I-4: TPBI (6.7%, 30 nm)/Alq (40 nm)/Mg:Ag=10:1

EXAMPLE 40

ITO/TCTA (30 nm)/I-4: CBP (6.7%, 30 nm)/BAlq (20 nm)/Alq (10 nm)/Mg:Ag=10:1

EXAMPLE 41

ITO/TPD (50 nm)/I-5: CBP (5%, 30 nm)/BCP (10 nm)/Alq (40 nm)/Mg:Ag=10:1

EXAMPLE 42

ITO/NPB (50 nm)/I-5: CBP (6.7%, 30 nm)/TPBI (10 nm)/Alq (40 nm)/Mg:Ag=10:1

EXAMPLE 43

ITO/NPB (50 nm)/I-5: CBP (7%, 30 nm)/BCP (10 nm)/Alq (40 nm)/Mg:Ag=10:1

EXAMPLE 44

ITO/2-TNATA (10 nm)/NPB (40 nm)/I-5: CBP (7%, 30 nm)/BCP (10 nm)/Alq (40 nm)/Mg:Ag=10:1

EXAMPLE 45

ITO/NPB (40 nm)/I-5: CCP (5%, 30 nm)/BCP (10 nm)/Alq (40 nm)/Mg:Ag=10:1

EXAMPLE 46

ITO/NPB (40 nm)/I-5: CCP (7%, 30 nm)/BCP (10 nm)/Alq (40 nm)/Mg:Ag=10:1

EXAMPLE 47

ITO/2-TNATA (10 nm)/NPB (40 nm)/I-5: CCP (4.7%, 30 nm)/BCP (10 nm)/Alq (40 nm)/Mg:Ag=10:1

TABLE 1

| Ex. | Turn-on voltage (V) | Max. external quantum efficiency (%) (voltage/volt) | Max. brightness (cd/m$^2$) (voltage/volt) | Max. efficiency (cd/A) (voltage/volt) | CIE coordinate (8 V) (x, y) | Max. PL wavelength (nm) |
|---|---|---|---|---|---|---|
| Ex. 22 | 3.0 | 2.21 (7.2) | 11627 (11.6) | 5.52 (7.2) | (0.55, 0.43) | 592 |
| Ex. 23 | 3.0 | 3.37 (8.0) | 16617 (13.2) | 8.44 (8.0) | (0.57, 0.43) | 594 |
| Ex. 24 | 3.2 | 3.27 (8.0) | 17798 (12.6) | 8.02 (8.0) | (0.56, 0.43) | 596 |
| Ex. 25 | 3.1 | 2.21 (6.8) | 12744 (11.8) | 4.95 (6.8) | (0.55, 0.40) | 596 |
| Ex. 26 | 4.0 | 7.35 (8.5) | 32921 (14.5) | 17.46 (8.5) | (0.58, 0.42) | 598 |
| Ex. 27 | 3.8 | 7.35 (7.0) | 34502 (13.5) | 16.59 (7.0) | (0.59, 0.40) | 598 |
| Ex. 28 | 3.8 | 5.23 (8.0) | 22321 (13.5) | 10.02 (8.0) | (0.61, 0.38) | 604 |
| Ex. 29 | 3.8 | 5.26 (8.0) | 22038 (13.5) | 9.89 (8.0) | (0.60, 0.37) | 608 |
| Ex. 30 | 4.0 | 5.50 (8.5) | 27669 (14.0) | 12.22 (8.5) | (0.59, 0.40) | 600 |
| Ex. 31 | 3.5 | 4.77 (8.0) | 22866 (14.0) | 6.14 (8.0) | (0.65, 0.33) | 622 |
| Ex. 32 | 3.1 | 4.27 (7.5) | 20037 (14.5) | 5.39 (7.5) | (0.66, 0.33) | 624 |
| Ex. 33 | 4.0 | 6.36 (10.0) | 23744 (16.0) | 8.32 (10.0) | (0.66, 0.34) | 622 |
| Ex. 34 | 3.8 | 6.58 (8.0) | 21825 (14.5) | 8.02 (8.0) | (0.66, 0.33) | 626 |
| Ex. 35 | 3.7 | 4.76 (8.5) | 17111 (14.0) | 5.56 (8.5) | (0.66, 0.33) | 624 |
| Ex. 36 | 3.3 | 3.45 (8.0) | 18472 (13.5) | 4.30 (8.0) | (0.66, 0.33) | 624 |
| Ex. 37 | 3.8 | 6.31 (9.0) | 22478 (15.5) | 7.87 (9.0) | (0.66, 0.33) | 624 |
| Ex. 38 | 3.6 | 6.10 (8.5) | 17364 (15.5) | 7.40 (8.5) | (0.63, 0.32) | 626 |
| Ex. 39 | 3.6 | 3.49 (9.0) | 12558 (15.0) | 4.15 (9.0) | (0.63, 0.32) | 626 |
| Ex. 40 | 4.3 | 3.58 (8.0) | 17694 (12.5) | 4.57 (8.0) | (0.64, 0.34) | 624 |
| Ex. 41 | 3.1 | 4.35 (7.5) | 22082 (13.5) | 6.18 (7.5) | (0.65, 0.34) | 618 |
| Ex. 42 | 3.0 | 2.55 (7.0) | 14431 (13.5) | 3.46 (7.0) | (0.65, 0.34) | 620 |
| Ex. 43 | 3.5 | 2.62 (7.5) | 12679 (14.0) | 3.51 (7.5) | (0.66, 0.34) | 620 |
| Ex. 44 | 4.2 | 2.90 (9.0) | 14268 (15.0) | 3.95 (9.0) | (0.65, 0.34) | 620 |
| Ex. 45 | 3.5 | 4.48 (8.0) | 20587 (16.0) | 6.12 (8.0) | (0.65, 0.34) | 618 |
| Ex. 46 | 3.3 | 2.71 (6.5) | 14389 (13.5) | 3.63 (6.5) | (0.65, 0.34) | 622 |
| Ex. 47 | 4.0 | 4.96 (9.0) | 20311 (16.0) | 6.93 (9.0) | (0.65, 0.34) | 620 |

The data shown in Table 1 indicate that the phosphorescent Ir complexes of the present invention can be used as a light emitting materials in the OLEDs. The OLED devices can emit phosphorescent lights from orange to red, while having high brightness, high current efficiencies, and excellent CIE coordinates.

The invention claimed is:

1. An organic light emitting diode (OLED) comprising: an anode on a substrate, an electroluminescent medium on said anode, and a cathode on said electroluminescent medium, characterized in that said electroluminescent medium comprises a light emitting layer comprising a phosphorescent Ir complex having the following structures (I) or (II):

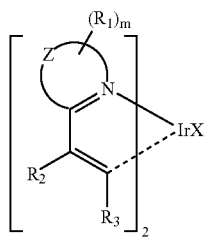

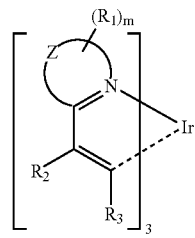

wherein X is an arbitrary monoanionic bidentate ligand;

Z is an arbitrary atomic moiety capable of forming a nitrogen-containing heterocyclic group;

$R_1$ is selected from the group consisting of H, halogen, C1-C6 alkyl, halogen-substituted C1-C6 alkyl, C1-C6 alkoxy, phenyl C1-C6 alkyl, amino, and aryl;

m is 0 or any positive integer determined by the ring size of said nitrogen-containing heterocyclic group;

$R_2$ is selected from the group consisting of H, halogen, C1-C6alkyl, halogen-substituted C1-C6alkyl, C1-C6alkoxy, phenyl C1-C6alkyl, amino, aryl, and heterocyclic aryl; and $R_3$ is aryl or heterocyclic aryl;

and provided that said nitrogen-containing heterocyclic group containing said Z moiety is not pyridine, quinoline or isoquinoline.

2. The OLED as claimed in claim 1, wherein said aryl is phenyl, naphthyl, diphenyl, anthryl, pyrenyl, or phenanthryl; said heterocyclic aryl is benzofuran or thiophene.

3. The OLED as claimed in claim 1, wherein said nitrogen-containing heterocyclic group is pyrazine, pyrimidine, pyrrole, pyrazole, imidazole, indole, thiazole, isothiazole, oxazole, isoxazole, benzothiazole, benzoxazole, or phenanthroline.

4. The OLED as claimed in claim 3, wherein said nitrogen-containing heterocyclic group is benzothiazole.

5. The OLED as claimed in claim 1, wherein $R_2$ is H or methyl; and $R_3$ is aryl group.

6. The OLED as claimed in claim 5 wherein $R_3$ is phenyl or naphthyl.

7. The OLED as claimed in claim 1, wherein said phosphorescent Ir complex has the structure (I), and X is acetylacetonate, aminoacid, salicylaldehyde, or iminoacetonate.

8. The OLED as claimed in claim 7, wherein X is acetylacetonate.

9. The OLED as claimed in claim 7, wherein X is aminoacid or salicylaldehyde.

10. The OLED as claimed in claim 1, wherein said light emitting layer will emit yellow to red light, when a voltage is applied on said anode and said cathode.

11. The OLED as claimed in claim 1, wherein said light emitting layer further comprises a host compound, and said Ir complex is doped into said host compound.

12. The OLED as claimed in claim 11, wherein said host compound is a compound having a hole transporting capability.

13. The OLED as claimed in claim 12, wherein said compound having a hole transporting capability is:

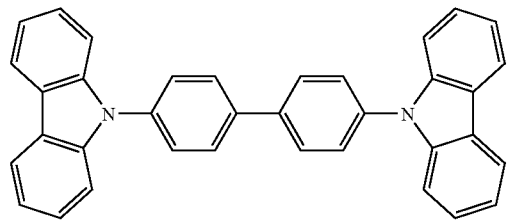

14. The OLED as claimed in claim 12, wherein said compound having a hole transporting capability is:

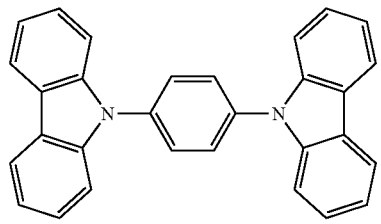

15. The OLED as claimed in claim 11, wherein said host compound is a compound having an electron transporting capability.

16. The OLED as claimed in claim 15, wherein said compound having an electron transporting capability is:

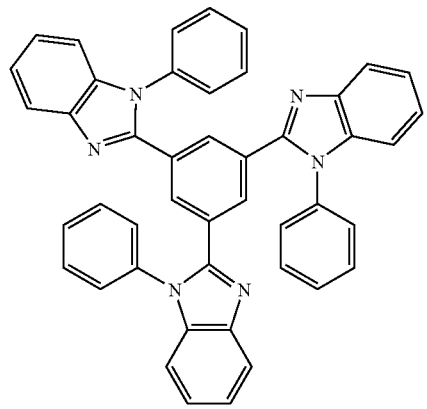

17. The OLED as claimed in claim 1, wherein said electroluminescent medium further comprises a hole transporting layer between said anode and said light emitting layer.

18. The OLED as claimed in claim 17, wherein said hole transporting layer comprises a compound of the following structure:

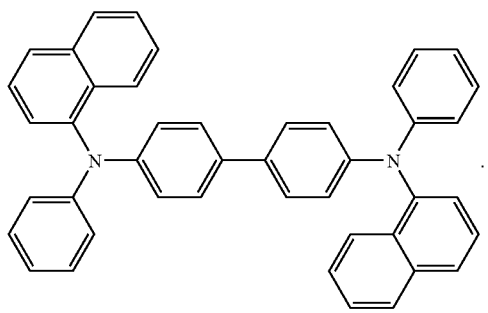

19. The OLED as claimed in claim 17, wherein said electroluminescent medium further comprises a hole injection modification layer between said anode and said hole transporting layer.

20. The OLED as claimed in claim 19, wherein said hole injection modification layer comprises a compound of the following structure:

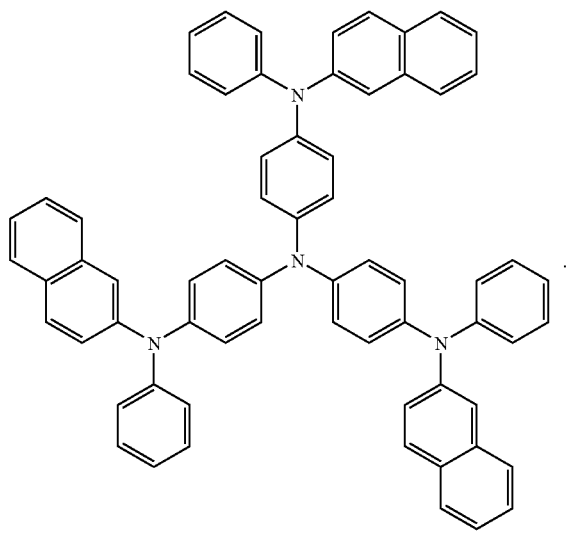

21. The OLED as claimed in claim 1, wherein said electroluminescent medium further comprises a hole-blocking layer between said cathode and said light emitting layer, and said hole-blocking layer contacts said light emitting layer.

22. The OLED as claimed in claim 21, wherein said hole-blocking layer comprises a compound of the following structure:

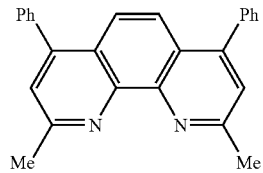

wherein Ph is phenyl, and Me is methyl.

23. The OLED as claimed in claim 21, wherein said hole-blocking layer comprises a compound of the following structure:

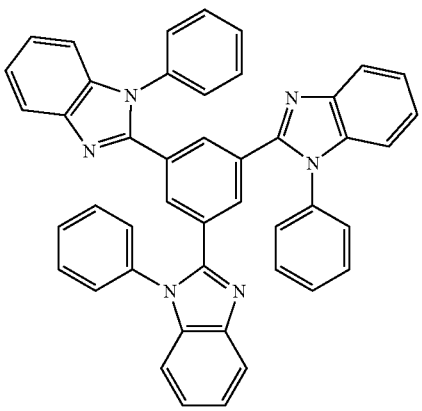

24. The OLED as claimed in claim 21, wherein said hole-blocking layer comprises a compound of the following structure:

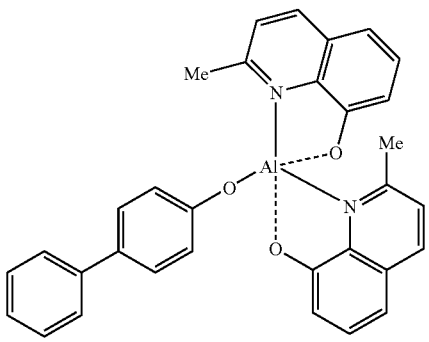

wherein Me is methyl.

25. The OLED as claimed in claim 21, wherein said electroluminescent medium further comprises an electron transporting layer between said hole-blocking layer and said cathode.

26. The OLED as claimed in claim 25, wherein said electron transporting layer comprises a compound of the following structure:

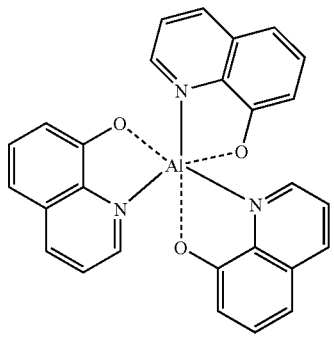

27. The OLED as claimed in claim 1, wherein said phosphorescent Ir complex is
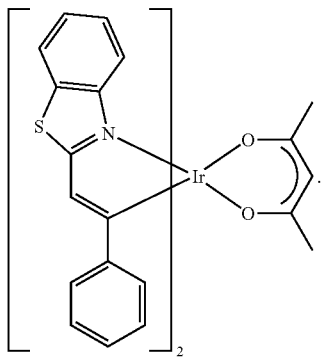
I-6
* * * * *